United States Patent
Han et al.

(10) Patent No.: US 11,575,481 B2
(45) Date of Patent: Feb. 7, 2023

(54) APPARATUS, SYSTEM AND METHOD FOR EFFICIENT PACKET RETRANSMISSION IN A DISAGGREGATED GNB ARCHITECTURE

(71) Applicant: Intel Corporation, Santa Clara, CA (US)

(72) Inventors: Jaemin Han, Portland, OR (US); Feng Yang, Beijing (CN); Alexander Sirotkin, Hod Hasharon (IL); Sudeep Palat, Cheltenham (GB)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 16/994,309

(22) Filed: Aug. 14, 2020

(65) Prior Publication Data

US 2020/0382254 A1    Dec. 3, 2020

Related U.S. Application Data

(60) Provisional application No. 62/887,428, filed on Aug. 15, 2019.

(51) Int. Cl.
*H04W 80/02* (2009.01)
*H04W 72/04* (2009.01)
*H04L 5/00* (2006.01)

(52) U.S. Cl.
CPC ......... *H04L 5/0048* (2013.01); *H04W 72/042* (2013.01); *H04W 80/02* (2013.01)

(58) Field of Classification Search
None
See application file for complete search history.

(56) References Cited

U.S. PATENT DOCUMENTS

| 6,041,047 A * | 3/2000 | Diachina ............... H04L 1/20 370/347 |
| 6,356,950 B1 * | 3/2002 | Tillmann .................. G06F 9/54 717/140 |
| 8,392,509 B1 * | 3/2013 | Klessig ............... H04L 43/0817 709/227 |

(Continued)

OTHER PUBLICATIONS

3GPP Organizational Partners, "3GPP TS 36.211 V15.6.0 (Jun. 2019), Technical Specification, 3rd Generation Partnership Project; Technical Specification Group Radio Access Network; Evolved Universal Terrestrial Radio Access (E-UTRA); Physical channels and modulation (Release 15)", (Jun. 2019) (239 pages).

(Continued)

*Primary Examiner* — Edan Orgad
*Assistant Examiner* — Emmanuel K Maglo
(74) *Attorney, Agent, or Firm* — Alliance IP, LLC

(57) ABSTRACT

An apparatus of a Radio Access Network (RAN) node, a system, and a method. The apparatus includes one or more processors to generate a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully delivered or delivered from the RAN node to a user equipment (UE); and cause transmission of the DDDS frame to a receiving node corresponding to the RAN node in a New Radio (NR) network, the receiving node hosting a NR packet data convergence protocol (PDCP) (NR PDCP) entity.

25 Claims, 18 Drawing Sheets

(56) References Cited

U.S. PATENT DOCUMENTS

| | | | | |
|---|---|---|---|---|
| 2003/0095310 | A1* | 5/2003 | Tillmann | H04Q 11/0005 |
| | | | | 398/91 |
| 2009/0257399 | A1* | 10/2009 | Kuo | H04W 12/03 |
| | | | | 370/331 |
| 2018/0270679 | A1* | 9/2018 | Laselva | H04W 36/0088 |
| 2018/0324644 | A1* | 11/2018 | Koskinen | H04L 47/30 |
| 2018/0368018 | A1* | 12/2018 | Kim | H04W 72/1289 |
| 2019/0090156 | A1* | 3/2019 | Kim | H04L 69/22 |
| 2019/0150224 | A1* | 5/2019 | Han | H04W 76/27 |
| | | | | 370/329 |
| 2019/0174449 | A1* | 6/2019 | Shan | H04W 60/00 |
| 2019/0357261 | A1* | 11/2019 | Cirik | H04W 24/08 |
| 2019/0380128 | A1* | 12/2019 | Park | H04W 48/10 |
| 2019/0394082 | A1* | 12/2019 | Cirik | H04W 76/28 |

OTHER PUBLICATIONS

3GPP Organizational Partners, "3GPP TS 38.211 V15.6.0 (Jun. 2019)", Technical Specification, 3rd Generation Partnership Project; Technical Specification Group Radio Access Network; NR; Physical channels and modulation (Release 15), (Jun. 2019) (93 pages).

3GPP Organizational Partners, "3GPP TS 38.212 V15.6.0 (Jun. 2019),"Technical Specification, 3rd Generation Partnership Project; Technical Specification Group Radio Access Network; NR; Multiplexing and channel coding (Release 15), (Jun. 2019) (98 pages).

3GPP Organizational Partners, "3GPP TS 38.213 V15.6.0 (Jun. 2019), Technical Specification, 3rd Generation Partnership Project; Technical Specification Group Radio Access Network; NR; Physical layer procedures for control (Release 15)", (Jun. 2019) (107 pages).

3GPP Organizational Partners, "3GPP TS 38.323 V15.6.0 (Jun. 2019), Technical Specification, 3rd Generation Partnership Project; Technical Specification Group Radio Access Network; NR; Packet Data Convergence Protocol (PDCP) specification (Release 15)", (Jun. 2019) (26 pages).

3GPP Organizational Partners, "3GPP TS 38.425 V15.6.0 (Jul. 2019), Technical Specification, 3rd Generation Partnership Project; Technical Specification Group Radio Access Network; NG-RAN; NR user plane protocol (Release 15)", (Jul. 2019) (22 pages).

* cited by examiner

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | | Out-of-sequence Status Report 1 | Data rate Ind. | Retransmitted NR PDCP SN Ind | Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| First Missing NR PDCP Sequence Number | | | | | | | | 0 or 3 |
| Number of Octets for Out-of-sequence Delivery Status | | | | | | | | 0 or 1 |
| Bitmap | | | | | | | | 0 or Number of Octets for Out-of-sequence Delivery Status |
| Padding | | | | | | | | 0-3 |

Fig. 2

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | Out-of-sequence Status Report 2 | | Data rate Ind. | Retransmitted NR PDCP SN Ind | Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| First Out-of-sequence Delivered NR PDCP Sequence Number | | | | | | | | 0 or 3 |
| Number of Octets for Out-of-sequence Delivery Status | | | | | | | | 0 or 1 |
| Bitmap | | | | | | | | 0 or Number of Octets for Out-of-sequence Delivery Status |
| Padding | | | | | | | | 0-3 |

Fig. 3

| Bits | | | | | | | | Number of Octets |
|---|---|---|---|---|---|---|---|---|
| 7 | 6 | 5 | 4 | 3 | 2 | 1 | 0 | |
| PDU Type (=1) | | | | Highest Transmitted NR PDCP SN Ind | Highest Delivered NR PDCP SN Ind | Final Frame Ind. | Lost Packet Report | 1 |
| Spare | | Out-of-sequence Status Report 3 | | Data rate Ind. | Retransmitted NR PDCP SN Ind | Delivered Retransmitted NR PDCP SN Ind | Cause Report | 1 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* Number of reported lost NR-U SN ranges) |
| End of lost NR-U Sequence Number range | | | | | | | | |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| Number of Out Of NR PDCP Sequence Number ranges reported | | | | | | | | 0 or 1 |
| Start of Out Of NR PDCP Sequence Number range | | | | | | | | 0 or (6* Number of Out Of NR PDCP Sequence Number ranges reported) |
| End of Out Of NR PDCP Sequence Number range | | | | | | | | |
| Padding | | | | | | | | 0-3 |

Fig. 4

| Octets | Bits | | | | | | | |
|---|---|---|---|---|---|---|---|---|
| | 8 | 7 | 6 | 5 | 4 | 3 | 2 | 1 |
| 1 | 0xn | | | | | | | |
| 2-(4n -1) | Control PDU for PDCP status report in TS 38.323 | | | | | | | |
| 4n | Next Extension Header Type (NOTE) | | | | | | | |

NOTE: The value of this field is '0' if no other Extension header follows.

Fig. 5

| Bits | | | | | | | | Number of Octets |
|---|---|---|---|---|---|---|---|---|
| 7 | 6 | 5 | 4 | 3 | 2 | 1 | 0 | |
| PDU Type (=0) | | | | Spare | DL Discard Blocks | DL Flush | Report polling | 1 |
| Spare | | | Report Out-of-sequence Delivered | Report Delivered | User data existence flag | Assistance Info. Report Polling Flag | Retransmission flag | 1 |
| NR-U Sequence Number | | | | | | | | 3 |
| DL discard NR PDCP PDU SN | | | | | | | | 0 or 3 |
| DL discard Number of blocks | | | | | | | | 0 or 1 |
| DL discard NR PDCP PDU SN start (first block) | | | | | | | | 0 or 3 |
| Discarded Block size (first block) | | | | | | | | 0 or 1 |
| ... | | | | | | | | |
| DL discard NR PDCP PDU SN start (last block) | | | | | | | | 0 or 3 |
| Discarded Block size (last block) | | | | | | | | 0 or 1 |
| DL report NR PDCP PDU SN | | | | | | | | 0 or 3 |
| Padding | | | | | | | | 0-3 |

Fig. 6

APPARATUS, SYSTEM AND METHOD FOR EFFICIENT PACKET RETRANSMISSION IN A DISAGGREGATED GNB ARCHITECTURE

CROSS REFERENCE TO RELATED APPLICATIONS

This application claims the benefit of and priority from U.S. Provisional Patent Application No. 62/887,428 entitled "METHODS FOR EFFICIENT PACKET RETRANSMISSION IN DISAGGREGATED GNB ARCHITECTURE," filed Aug. 15, 2019, the entire disclosure of which is incorporated herein by reference.

FIELD

Various embodiments generally relate to the field of cellular communications, and particularly to packet retransmissions in cellular networks.

BACKGROUND

Current Third Generation Partnership Project (3GPP) New Radio (NR) specifications (or 5G specifications) do not specifically address issues related to efficient retransmissions in disaggregated RAN node architectures.

BRIEF DESCRIPTION OF THE DRAWINGS

FIG. 2 illustrates a frame structure of a Downlink Data Delivery Status (DDDS) frame according to a first option of a first embodiment;

FIG. 3 illustrates a frame structure of a DDDS frame according to a second option of a first embodiment;

FIG. 4 illustrates a frame structure of a DDDS frame according to a third option of a first embodiment;

FIG. 5 illustrates a new General Protocol Radio Service Tunneling Protocol (GTP) extension header according to a second embodiment;

FIG. 6 illustrates a downlink (DL) User Data frame according to the third embodiment

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Some embodiments described herein are related to one or more third generation partnership project (3GPP) specifications. Examples of these specifications include, but are not limited to, one or more 3GPP new radio (NR) specifications and one or more specifications directed and/or related to Radio Layer 1 (RAN1), Radio Layer 2 (RAN2), and/or fifth generation (5G) mobile networks/systems.

A study item (SI) in NR to enhance a disaggregated gNodeB (or gNB) architecture has an objective to enhance packet data convergence protocol (PDCP) protocol data unit (PDU) retransmissions and associated flow control between a Central Unit (CU) and a Distributed Unit (DU).

Figure 1:
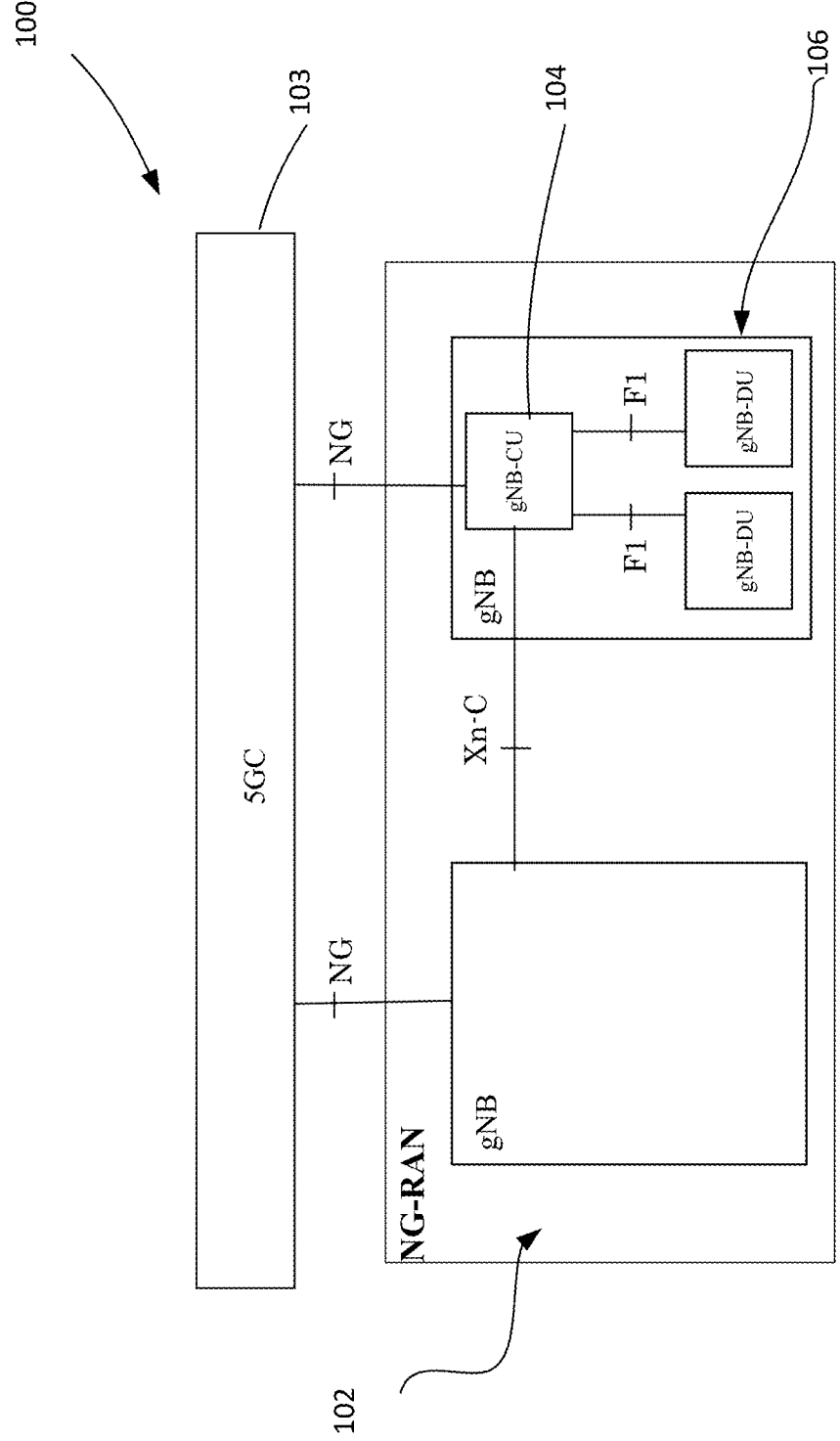
FIG. 1 illustrates an overall architecture of a NR radio access network.

FIG. 1 shows an overall architecture of a NR radio access network (NR-RAN) 100. The NG-RAN 100 includes a set of gNBs 102 connected to the 5G core network (5GC) 103 through the next generation (NG) interface. An gNB can support frequency division duplexing (FDD) mode, time division duplexing (TDD) mode or dual mode operation. gNBs can be interconnected through the Xn interface. A gNB may consist of a gNB-Central Unit (gNB-CU) 104 and one or more gNB Distributed Unit(s) (gNB-DU(s)) 106. A gNB-CU and a gNB-DU are connected via F1 interface. One gNB-DU is connected to only one gNB-CU. In case of network sharing with multiple cell identification (ID) broadcast, each cell identity associated with a subset of Public Land Mobile Network (PLMNs) corresponds to a gNB-DU and the gNB-CU it is connected to, i.e. the corresponding gNB-DUs share the same physical layer cell resources. For resiliency, a gNB-DU may be connected to multiple gNB-CUs by appropriate implementation. NG, Xn and F1 are logical interfaces. For NG-RAN, the NG and Xn-Control (Xn-C) interfaces for a gNB including a gNB-CU and gNB-DUs terminate in the gNB-CU. For EN-DC, the S1-U (S1-User plane) and X2-C (X2-Control plane) interfaces for a gNB including a gNB-CU and gNB-DUs terminate in the gNB-CU. The gNB-CU and connected gNB-DUs are only visible as a gNB to other gNBs and to the 5GC.

To address the issue of explosive increases of the bandwidth required for the transport between the gNB-CU and gNB-DU by the introduction of massive multiple-input multiple output (MIMO) and extending the frequency bandwidth using Cloud RAN (C-RAN) deployment, the functional split between gNB-CU and gNB-DU within gNB and the corresponding open interface between these nodes has been defined. Specifically, a functional split has been adopted where the PDCP layer and above can be located in the gNB-CU, and the RLC layer and below can be located in the gNB-DU. The standard interface between them is specified as F1.

3GPP standardization has defined an open interface between the C-plane termination parts and U-plane termination parts of gNB-CU so that the functional separation between the two can be achieved even between different vendors. A node that terminates the C-plane of gNB-CU is called gNB-CU-CP, and a node that terminates the U-plane of the gNB-CU is called gNB-CU-UP. The standard interface between these nodes is specified as E1.

F1-C refers to the standard interface between the gNB-DU and a control plane of the gNB-CU, and F1-U refers to the standard interface between the gNB-DU and a user plane of the gNB-CU.

A gNB-CU refers to a logical node hosting radio resource control (RRC), Service Data Adaptation Protocol (SDAP) and PDCP protocols of the gNB or RRC, and PDCP protocols of the en-gNB, and controls the operation of one or more gNB-DUs. A en-gNB represents a version of NR gNB working under the Evolved Universal Terrestrial Radio Access-New Radio (E-UTRA NR) Dual Connectivity (EN-DC) feature, where the master is a Long Term Evolution (LTE) evolved NodeB (eNB) connected to evolved packet core (EPC). DC allows a UE to exchange data between itself and both a NR base station and a LTE base station. The gNB-CU terminates the F1 interface connected with the gNB-DU.

A gNB-DU refers to a logical node hosting RLC, medium access control (MAC) and physical (PHY) layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU. A gNB-CU-Control Plane (gNB-CU-CP) is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. A gNB-CU-User Plane (gNB-CU-UP) is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

Enhancements to disaggregated gNB scenarios rely at least in part on the following:

(1) identifying detailed solutions for further enhancements on current flow control with the following aspects considered.
  a. that PDCP PDUs may be delivered in the Uu interface (the radio interface between the UE and the gNB) out-of-sequence.
  b. The re-transmitted PDCP PDUs may arrive at DU out of order.

Note that the solution shall be backward compatible (for example, carefully consider the fact no criticality handling is defined in U-plane protocol specification).

(2) Identifying detailed solutions to support the scenario that one UE connects to several gNB-CU-UPs, which belong to different security domains.

Note that CP/UP separation and CU/DU split should be invisible to other nodes (especially UE should not be impacted).

The flow control mechanism is still based upon LTE dual connectivity (DC) mechanisms and the current Downlink Data Delivery Status (DDDS) only provides the highest in-sequence delivery status. As a result, out-of-sequence PDCP PDUs delivered to the UE could not be known by the gNB-CU, which may incur unnecessary retransmissions of PDCP PDUs during an intra-CU inter-DU mobility scenario.

Some mechanisms to support out-of-sequence delivery status reporting from DU to CU may be needed. Taking the already specified PDCP status report between UE and network-defined in 3GPP TS 38.323 V15.6.0 (2019-06) into account however, an out-of-sequence report may take up to more than 16K octets (e.g., a bitmap representation for the half of 18-bit PDCP sequence number (SN) space requires 16384 octets). Considering the above, the present disclosure discusses stage-3 enhancements for out-of-sequence delivery status reporting.

Embodiments discussed herein are not limited to a disaggregated gNB (for example, between a CU and DU over a F1 interface). Embodiments may be applicable to any scenarios involving a node hosting a PDCP entity and a corresponding node across any one of X2, Xn, and W1 interfaces.

A first embodiment provides approaches to support out-of-sequence reporting from DU over NR UP frames as enhancements to 3GPP TS 38.425 V15.6.0 (2019-07).

A second embodiment provides a new General Protocol Radio Service Tunneling Protocol (GTP) extension header to carry out-of-sequence delivery status report or PDCP status report as approaches to support out-of-sequence reporting from DU without using NR UP frames in 3GPP TS 38.425 V15.6.0 (2019-07).

A third embodiment provides a DL USER DATA frame or a X2/Xn/F1/W1AP that is enhanced to trigger out-of-sequence delivery status report (e.g., polling, periodic configuration, etc.) as approaches to support and configure triggering of an out-of-sequence delivery status report over NR user plane (UP) frames in TS 38.425 or over a control plane.

Various embodiments of the present disclosure provide several mechanisms to enable a node hosting PDCP entity (e.g., a CU) to know out-of-sequence PDCP PDU delivery status to the UE from the corresponding node (e.g., a DU). Exemplary embodiments with respect to 3GPP TS 38.425 are as follows, noting that references to section numbers are with respect to sections existing or proposed to be added to 3GPP TS 38.425.

According to the first embodiment, a DDDS (DL Data Delivery Status) frame or Assistance Information Data frame is enhanced, or a new frame is defined, to provide an out-of-sequence delivery status report.

FIG. 2 shows an embodiment of a DDDS frame, depicting an example of how a frame is structured when all optional information elements (IEs) (i.e., those whose presence is indicated by an associated flag) are present, according to a first option of a first embodiment. Absence of an IE changes the position of all subsequent IEs on octet level, and embodiments encompass such changes.

In Section 5.5.2.2 of 3GPP TS 38.425, relating to DDDS (for PDU Type 1), the frame may be defined to transfer feedback to allow the receiving node (i.e. the node that hosts the NR PDCP entity) to control the downlink user data flow via the sending node (i.e. the corresponding node). The corresponding node is the peer of the node hosting the PDCP entity that provides feedback about DL data flow. From a CU-DU split example, CU is the node hosting PDCP entity, DU is the corresponding node. The portions of this frame that reflect changes according to the first option of the first embodiment are shown in boldface font in FIG. 2. These changes may for example be entered into the table at FIG. 5.5.2.2-1: DL DATA DELIVERY STATUS (PDU Type 1) Format of 3GPP TS 38.425.

The new information elements of the DDDS (for PDU type 1) according to this first embodiment may be entered in TS 38.425 in subsections under section 5.5.3.

In particular, in a section 5.5.3.A or other subsection, the Out-of-sequence Status Report 1 information element shown in FIG. 2 may have the following information associated with the same:

Description: This parameter indicates the presence of First Missing NR PDCP Sequence Number, Number of Octets for Out-of-sequence Delivery Status and Bitmap.

Value range: {0=First Missing NR PDCP Sequence Number, Number of Octets for Out-of-sequence Delivery Status and Bitmap not present, 1=First Missing NR PDCP Sequence Number, Number of Octets for Out-of-sequence Delivery Status and Bitmap present}.

Field length: 1 bit.

In particular, in a section 5.5.3.B or other subsection, the First Missing NR PDCP Sequence Number information element shown in FIG. 2 may have the following information associated with the same:

Description: This parameter indicates the first missing NR PDCP PDU SN. In case that the Highest successfully delivered NR PDCP Sequence Number is present, this field is set to the next SN of the Highest successfully delivered NR PDCP Sequence Number reported.

Value range: $\{0 \ldots 2^{18}-1\}$.

Field length: 3 octets.

In particular, in a section 5.5.3.C or other subsection, the Number of Octets for Out-of-sequence Delivery Status information element shown in FIG. 2 may have the following information associated with the same:

Description: This parameter indicates the number of octets used by the Bitmap field.

Value range: {1 . . . 255}.

Field length: 1 octet.

In particular, in a section 5.5.3.D or other subsection, the Bitmap information element shown in FIG. 2 may have the following information associated with the same:

Description: This field indicates which PDCP PDUs are successfully delivered or not. The bit position of Nth bit in the Bitmap is N, i.e., the bit position of the first bit in the Bitmap is 1.

TABLE 5.5.3.D-1

| Bit | Bitmap Description |
|---|---|
| 0 | PDCP PDU with SN = (First Missing NR PDCP Sequence Number + bit position) modulo the configured PDCP SN space is not delivered. |

TABLE 5.5.3.D-1-continued

| Bit | Bitmap Description |
|---|---|
| 1 | PDCP SDU with SN = (First Missing NR PDCP Sequence Number + bit position) modulo the configured PDCP SN space is successfully delivered. |

Value range: {0 . . . 28×Number of Octets for Out-of-sequence Delivery Status−1}.

Field length: Number of Octets for Out-of-sequence Delivery Status.

Other exemplary alternative options to the first embodiment with respect to 3GPP TS 38.425 are described below.

FIG. 3 shows an embodiment of a DDDS frame, depicting an example of how a frame is structured when all optional information elements (IEs) (i.e., those whose presence is indicated by an associated flag) are present, according to a second option of the first embodiment. Absence of an IE changes the position of all subsequent IEs on octet level, and embodiments encompass such changes.

The portions of this frame that reflect changes according to the second option of the first embodiment are shown in boldface font in FIG. 3. These changes may for example be entered into the table at FIG. 5.5.2.2-1: DL DATA DELIVERY STATUS (PDU Type 1) Format of 3GPP TS 38.425.

The new information elements of the DDDS (for PDU type 1) according to this second option of the first embodiment may be entered in TS 38.425 in subsections under section 5.5.3.

In particular, in a section 5.5.3.E or other subsection, the Out-of-sequence Status Report 2 information element shown in FIG. 3 may have the following information associated with the same:

Description: This parameter indicates the presence of First Out-of-sequence Delivered NR PDCP Sequence Number, Number of Octets for Out-of-sequence Delivery Status and Bitmap.

Value range: {0=First Out-of-sequence Delivered NR PDCP Sequence Number, Number of Octets for Out-of-sequence Delivery Status and Bitmap not present, 1=First Missing NR PDCP Sequence Number, Number of Octets for Out-of-sequence Delivery Status and Bitmap present}.

Field length: 1 bit.

In particular, in a section 5.5.3.F or other subsection, the First Out-of-sequence Delivered NR PDCP Sequence Number information element shown in FIG. 3 may have the following information associated with the same:

Description: This parameter indicates the first out-of-sequence delivered NR PDCP PDU SN beyond the Highest successfully delivered NR PDCP Sequence Number reported.

Value range: $\{0 \ldots 2^{18}-1\}$.

Field length: 3 octets.

In particular, in a section 5.5.3.G or other subsection, the Number of Octets for Out-of-sequence Delivery Status information element shown in FIG. 3 may have the following information associated with the same:

Description: This parameter indicates the number of octets used by the Bitmap field.

Value range: {1 . . . 255}.

Field length: 1 octet.

In particular, in a section 5.5.3.F or other subsection, the Bitmap information element shown in FIG. 3 may have the following information associated with the same:

Description: This field indicates which PDCP PDUs are successfully delivered or not. The bit position of Nth bit in the Bitmap is N, i.e., the bit position of the first bit in the Bitmap is 1.

TABLE 5.5.3.H-1

Bitmap

| Bit | Description |
|---|---|
| 0 | PDCP PDU with SN = (First Out-of-sequence Delivered NR PDCP Sequence Number + bit position) modulo the configured PDCP SN space is not delivered. |
| 1 | PDCP SDU with SN = (First Out-of-sequence Delivered NR PDCP Sequence Number + bit position) modulo the configured PDCP SN space is successfully delivered. |

Value range: {0 . . . 28×Number of Octets for Out-of-sequence Delivery Status−1}.

Field length: Number of Octets for Out-of-sequence Delivery Status.

FIG. 4 shows an embodiment of a DDDS frame, depicting an example of how a frame is structured when all optional information elements (IEs) (i.e., those whose presence is indicated by an associated flag) are present, according to a third option of the first embodiments. Absence of an IE changes the position of all subsequent IEs on octet level, and embodiments encompass such changes.

The portions of this frame that reflect changes according to the third option of the first embodiment are shown in boldface font in FIG. 4. These changes may for example be entered into the table at FIG. 5.5.2.2-1: DL DATA DELIVERY STATUS (PDU Type 1) Format of 3GPP TS 38.425.

The new information elements of the DDDS (for PDU type 1) according to this third option of the first embodiment may be entered in TS 38.425 in subsections under section 5.5.3.

In particular, in a section 5.5.3.I or other subsection, the Out-of-sequence Status Report 3 information element shown in FIG. 4 may have the following information associated with the same:

Description: This parameter indicates the presence of Number of Out Of NR PDCP Sequence Number ranges reported, Start of Out Of NR PDCP Sequence Number range and End of Out Of NR PDCP Sequence Number range.

Value range: {0=Number of Out Of NR PDCP Sequence Number ranges reported, Start of Out Of NR PDCP Sequence Number range and End of Out Of NR PDCP Sequence Number range not present, 1=Number of Out Of NR PDCP Sequence Number ranges reported, Start of Out Of NR PDCP Sequence Number range and End of Out Of NR PDCP Sequence Number range present}.

Field length: 1 bit.

In particular, in a section 5.5.3.J or other subsection, the Number of Out Of NR PDCP Sequence Number ranges reported information element shown in FIG. 4 may have the following information associated with the same:

Description: This parameter indicates the number of Out Of NR PDCP PDU SN ranges reported.

Value range: {1 . . . 255}.

Field length: 1 octet.

In particular, in a section 5.5.3.K or other subsection, the Start of Out Of NR PDCP Sequence Number range information element shown in FIG. 4 may have the following information associated with the same:

Description: This parameter indicates the start of an NR PDCP PDU SN range reported to be successfully delivered.

Value range: {0 . . . $2^{18}-1$}.

Field length: 3 octets.

In particular, in a section 5.5.3.L or other subsection, the End of Out Of NR PDCP Sequence Number range information element shown in FIG. 4 may have the following information associated with the same:

Description: This parameter indicates the end of an NR PDCP PDU SN range reported to be successfully delivered.

Value range: {0 . . . $2^{18}-1$}.

Field length: 3 octets.

According to a second embodiment, a new GTP extension header may be defined to carry out-of-sequence delivery status report or PDCP status report as it is. An exemplary embodiment with respect to 3GPP TS 29.281 is shown by way of FIG. 5.

Referring to FIG. 5, the shown table and values may for example be entered into TS 38.425 at a FIG. 5.2.2.X-1: PDCP Status Report Extension Header relating to a PDCP Status Report Container. This extension header may be transmitted in a G-PDU over the X2-U, Xn-U and F1-U user plane interfaces, within NG-RAN and, for EN-DC, within E-UTRAN. This container has a variable length and its content is specified in 3GPP TS 38.323. A G-PDU message with this extension header may be sent without a T-PDU.

According to a third embodiment, the DL User Data frame or X2/Xn/F1/W1AP is enhanced to trigger an out-of-sequence delivery status report (e.g., by way of polling, periodic configuration, etc.).

FIG. 6 shows an embodiment of a DL User Data frame according to the third embodiment. The portion of this frame that reflects a change according to the third embodiment is shown in boldface font in FIG. 6. These changes may for example be entered into the table at FIG. 5.5.2.1: DL USER DATA (PDU Type 0) Format of 3GPP TS 38.425. This frame format is defined to allow the corresponding node to detect lost NR-U packets and is associated with the transfer of a Downlink NR PDCP PDU.

In particular, in a section 5.5.3.M or other subsection, the Report Out-of-sequence Delivered information element shown in FIG. 6 may have the following information associated with the same:

Description: This parameter indicates that the node hosting the NR PDCP entity requests providing the out-of-sequence delivery status report.

Value range: {0=out-of-sequence delivery status report not requested, 1=out-of-sequence delivery status report requested}.

Field length: 1 bit.

Implementation architectures and systems for the functionalities of the first, second and third embodiments described above are now set forth below.

Figure 7:
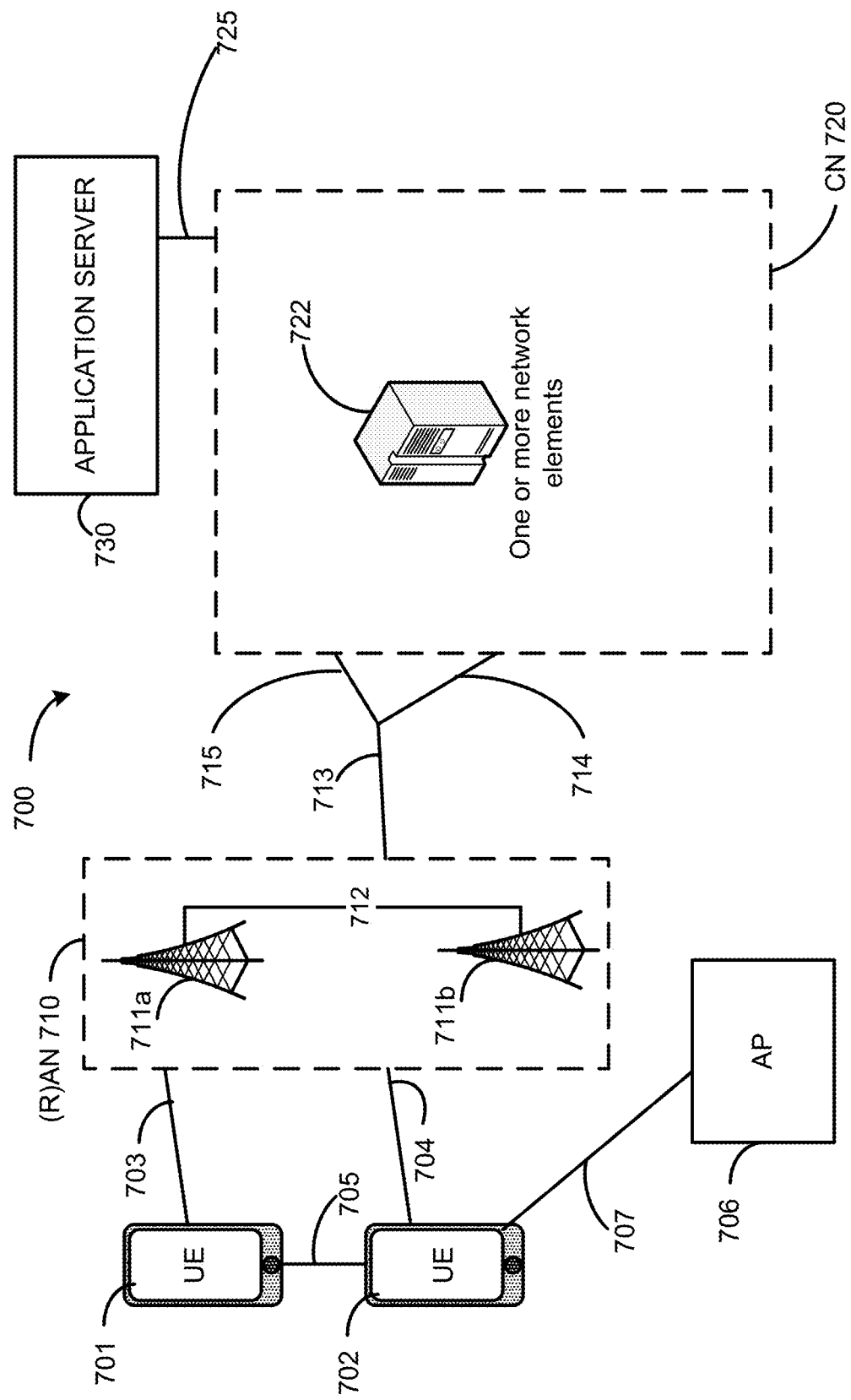
FIG. 7 illustrates an example architecture of a system of a network, in accordance with various embodiments.

As shown by FIG. 7, the system 700 includes UE 701a and UE 701b (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 701 may be NB-IoT UEs 701. NB-IoT provides access to network services using physical layer optimized for very low power consumption (e.g., full carrier BW is 180 kHz, subcarrier spacing can be 3.75 kHz or 15 kHz). A number of E-UTRA functions are not used for NB-IoT and need not be supported by RAN nodes 711 and UEs 701 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 701 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 701 may be MF UEs 701. MF UEs 701 are LTE-based UEs 701 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 701 may be NB-IoT UEs 701 that operate according to MF. In such embodiments, these UEs 701 may be referred to as "MF NB-IoT UEs 701," however, the term "NB-IoT UE 701" may refer to an "MF UE 701" or an "MF and NB-IoT UE 701" unless stated otherwise. Thus, the terms "NB-IoT UE 701," "MF UE 701," and "MF NB-IoT UE 701" may be used interchangeably throughout the present disclosure.

The UEs 701 may be configured to connect, for example, communicatively couple, with an or RAN 710. In embodiments, the RAN 710 may be an NG RAN or a 5G RAN, an E-UTRAN, an MF RAN, or a legacy RAN, such as a UTRAN or GERAN. As used herein, the term "NG RAN" or the like may refer to a RAN 710 that operates in an NR or 5G system 700, the term "E-UTRAN" or the like may refer to a RAN 710 that operates in an LTE or 4G system 700, and the term "MF RAN" or the like refers to a RAN 710 that operates in an MF system 700. The UEs 701 utilize connections (or channels) 703 and 704, respectively, each of which comprises a physical communications interface or layer (discussed in further detail below). The connections 703 and 704 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more physical and/or logical channels, including but not limited to the PSCCH, PSSCH, PSDCH, and PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, gNodeBs, RAN nodes, eNBs, eNodeBs, NodeBs, RSUs, MF-APs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (e.g., a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher BW compared to macrocells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs (see e.g., FIG. 10), and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC (e.g., CN 920 of FIG. 9) via an NG interface (discussed infra). In MF implementations, the MF-APs 711 are entities that provide MulteFire radio services, and may be similar to eNBs 711 in an 3GPP architecture. Each MF-AP 711 includes or provides one or more MF cells.

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 711 to the UEs 701, while UL transmissions from the UEs 701 to RAN nodes 711 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where $k=0, \ldots, N_{RB}^{DL}N_{sc}^{RB}-1$ and $l=0, \ldots N_{symb}^{DL}-1$ are the indices in the frequency and time domains, respectively. RE (k,l) on antenna port p corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211.

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with a half-frame 0 comprising subframes 0-4 and a half-frame 1 comprising subframes 5-9. There is one set of frames in the UL and one set of frames in the DL on a carrier. Uplink frame number i for transmission from the UE 701 starts $T_{TA}(N_{TA}+N_{TA,offset})T_c$ before the start of the corresponding downlink frame at the UE where $N_{TA,offset}$ is given by 3GPP TS 38.213. For subcarrier spacing configuration $\mu$, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 3GPP TS 38.211. The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 701 only transmit in 'uplink' or 'flexible' symbols.

For each numerology and carrier, a resource grid of $N_{grid,x}^{size,\mu} N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (i.e., uplink or downlink) with the subscript x set to DL for downlink and x set to UL for uplink. There is one resource grid for a given antenna port p, subcarrier spacing configuration $\mu$, and transmission direction (i.e., downlink or uplink).

An RB is defined as $N_{sc}^{RB}=12$ consecutive subcarriers in the frequency domain. Common RBs are numbered from 0 and upwards in the frequency domain for subcarrier spacing configuration $\mu$. The center of subcarrier 0 of common resource block 0 for subcarrier spacing configuration $\mu$ coincides with 'point A'. The relation between the common resource block number $n_{CRB}^\mu$ in the frequency domain and resource elements (k,l) for subcarrier spacing configuration $\mu$ is given by $$n_{CRB}^\mu = \left\lfloor \frac{k}{N_{sc}^{RB}} \right\rfloor$$

where k is defined relative to point A such that k=0 corresponds to the subcarrier centered around point A. Point A serves as a common reference point for resource block grids and is obtained from offsetToPointA for a PCell downlink where offsetToPointA represents the frequency offset between point A and the lowest subcarrier of the lowest resource block, which has the subcarrier spacing provided by the higher-layer parameter subCarrierSpacingCommon and overlaps with the SS/PBCH block used by the UE for initial cell selection, expressed in units of resource blocks assuming 15 kHz subcarrier spacing for FR1 and 60 kHz subcarrier spacing for FR2; and absoluteFrequencyPointA for all other cases where absoluteFrequencyPointA represents the frequency-location of point A expressed as in ARFCN.

A PRB for subcarrier configuration $\mu$ are defined within a BWP and numbered from 0 to $N_{BWP,i}^{size,\mu}-1$ where i is the number of the BWP. The relation between the physical resource block $n_{PRB}^\mu$ in BWPi and the common RB $n_{CRB}^\mu$ is given by $n_{CRB}^\mu = n_{PRB}^\mu + N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration $\mu$ is called an RE and is uniquely identified by $(k, l)_{p,\mu}$ where k is the index in the frequency domain and l refers to the symbol position in the time domain relative to some reference point. Resource element $(k, l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which the symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 for a given numerology $\mu_i$ in BWP i on a given carrier. The starting position $N_{BWP,i}^{start,\mu}$ and the number of resource blocks $N_{BWP,i}^{size,\mu}$ in a BWP shall fulfill $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a BWP is described in clause 12 of 3GPP TS 38.213. The UEs 701 can be configured with up to four BWPs in the DL with a single DL BWP being active at a given time. The UEs 701 are not expected to receive PDSCH, PDCCH, or CSI-RS (except for RRM) outside an active BWP. The UEs 701 can be configured with up to four BWPs in the UL with a single UL BWP being active at a given time. If a UE 701 is configured with a supplementary UL, the UE 701 can be configured with up to four additional BWPs in the supplementary UL with a single supplementary UL BWP being active at a given time. The UEs 701 do not transmit PUSCH or PUCCH outside an active BWP, and for an active cell, the UEs do not transmit SRS outside an active BWP.

An NB is defined as six non-overlapping consecutive PRBs in the frequency domain. The total number of DL NBs in the DL transmission BW configured in the cell is given by $$n_{NB}^{DL} = \left\lfloor \frac{N_{RB}^{DL}}{6} \right\rfloor.$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB} + i_0 + i & \text{if } N_{RB}^{UL} \bmod 2 = 0 \\ 6n_{NB} + i_0 + i & \text{if } N_{RB}^{UL} \bmod 2 = 1 \text{ and } n_{NB} < N_{NB}^{UL}/2, \\ 6n_{NB} + i_0 + i + 1 & \text{if } N_{RB}^{UL} \bmod 2 = 1 \text{ and } n_{NB} \geq N_{NB}^{UL}/2 \end{cases}$$

$i = 0, 1, \ldots, 5$ where $$i_0 = \left\lfloor \frac{N_{RB}^{UL}}{2} \right\rfloor - \frac{6 N_{NB}^{UL}}{2}.$$

If $N_{NB}^{UL} \geq 4$, a wideband is defined as four non-overlapping narrowbands in the frequency domain. The total number of uplink widebands in the uplink transmission bandwidth configured in the cell is given by $$N_{WB}^{UL} = \left\lfloor \frac{N_{NB}^{UL}}{4} \right\rfloor$$

and the widebands are numbered $n_{WB}=0, \ldots, N_{WB}^{UL}-1$ in order of increasing narrowband number where wideband $n_{WB}$ is composed of narrowband indices $4n_{WB}+i$ where $i=0,1,\ldots,3$. If $N_{NB}^{UL}=1$ and the single wideband is composed of the $N_{NB}^{UL}$ non-overlapping narrowband(s).

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 710 of FIG. 7) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 701. Typically, DL scheduling (assigning control and shared channel resource blocks to the UE 701 within a cell) may be performed at any of the RAN nodes 711 based on channel quality information fed back from any of the UEs 701. The downlink resource assignment information may be sent on the PDCCH used for (e.g., assigned to) each of the UEs 701. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 701 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212, DCI formats 0_0 through 2_3 as discussed in section 7.3 of 3GPP TS 38.212, or the like). The UEs 701 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 701 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212.

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

As alluded to previously, the PDCCH can be used to schedule DL transmissions on PDSCH and UL transmissions on PUSCH, wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 701 of a slot format; notifying one or more UEs 701 of the PRB(s) and OFDM symbol(s) where a UE 701 may assume no transmission is intended for the UE; transmission of TPC commands for PUCCH and PUSCH; transmission of one or more TPC commands for SRS transmissions by one or more UEs 701; switching an active BWP for a UE 701; and initiating a random access procedure.

In NR implementations, the UEs 701 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 701 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the BWs of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 711 may be configured to communicate with one another via interface 712. In embodiments where the system 700 is an LTE system (e.g., when CN 720 is an EPC 820 as in FIG. 8), the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 700 is an MF system (e.g., when CN 720 is an NHCN 720), the interface 712 may be an X2 interface 712. The X2 interface may be defined between two or more RAN nodes 711 (e.g., two or more MF-APs and the like) that connect to NHCN 720, and/or between two MF-APs connecting to NHCN 720. In these embodiments, the X2 interface may operate in a same or similar manner as discussed previously.

In embodiments where the system 700 is a 5G or NR system (e.g., when CN 720 is an 5GC 920 as in FIG. 9), the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, CN 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF (e.g., the N3 and/or N9 reference points), and the S1 control plane (NG-C) interface 715, which is a signaling interface between the RAN nodes 711 and AMFs 720 (e.g., the N2 reference point). Embodiments where the CN 720 is a 5GC 720 are discussed in more detail with regard to FIG. 9.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

In embodiments where the CN 720 is an MF NHCN 720, the one or more network elements 722 may include or operate one or more NH-MMEs, local AAA proxies, NH-GWs, and/or other like MF NHCN elements. The NH-MME provides similar functionality as an MME in EPC 720. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHCN-GW provides similar functionality as the S-GW discussed previously in interactions with the MF-APs over the S1 interface 713 and is similar to the TWAG in interactions with the PLMN PDN-GWs over the S2a interface. In some embodiments, the MF APs 711 may connect with the EPC 720 discussed previously. Additionally, the RAN 710 (referred to as an "MF RAN 710" or the like) may be connected with the NHCN 720 via an S1 interface 713. In these embodiments, the S1 interface 713 may be split into two parts, the S1-U interface 714 that carries traffic data between the RAN nodes 711 (e.g., the "MF-APs 711") and the NH-GW, and the S1-MME-N interface 715, which is a signaling interface between the RAN nodes 711 and NH-MMEs. The S1-U interface 714 and the S1-MME-N interface 715 have the same or similar functionality as the S1-U interface 714 and the S1-MME interface 715 of the EPC 720 discussed herein.

Figure 8:
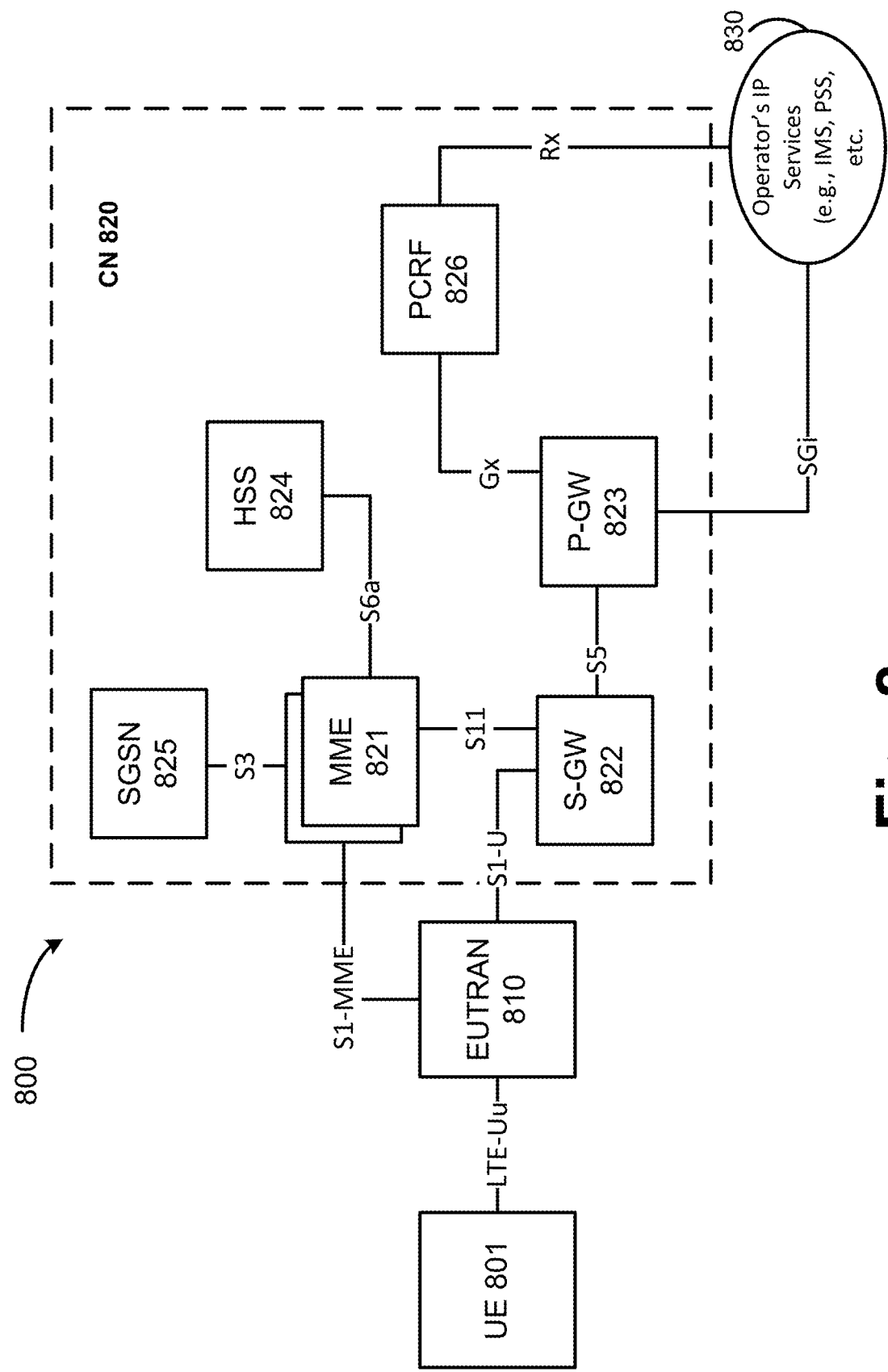
FIG. 8 illustrates an example architecture of a system including a first core network, in accordance with various embodiments.

FIG. 8 illustrates an example architecture of a system 800 including a first CN 820, in accordance with various embodiments. In this example, system 800 may implement the LTE standard wherein the CN 820 is an EPC 820 that corresponds with CN 720 of FIG. 7. Additionally, the UE 801 may be the same or similar as the UEs 701 of FIG. 7, and the E-UTRAN 810 may be a RAN that is the same or similar to the RAN 710 of FIG. 7, and which may include RAN nodes 711 discussed previously. The CN 820 may comprise MMEs 821, an S-GW 822, a P-GW 823, a HSS 824, and a SGSN 825.

The MMEs 821 may be similar in function to the control plane of legacy SGSN, and may implement MM functions to keep track of the current location of a UE 801. The MMEs 821 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 801, provide user identity confidentiality, and/or perform other like services to users/subscribers. Each UE 801 and the MME 821 may include an MM or EMM sublayer, and an MM context may be established in the UE 801 and the MME 821 when an attach procedure is successfully completed. The MM context may be a data structure or database object that stores MM-related information of the UE 801. The MMEs 821 may be coupled with the HSS 824 via an S6a reference point, coupled with the SGSN 825 via an S3 reference point, and coupled with the S-GW 822 via an S11 reference point.

The SGSN 825 may be a node that serves the UE 801 by tracking the location of an individual UE 801 and performing security functions. In addition, the SGSN 825 may perform Inter-EPC node signaling for mobility between 2G/3G and E-UTRAN 3GPP access networks; PDN and S-GW selection as specified by the MMEs 821; handling of UE 801 time zone functions as specified by the MMEs 821; and MME selection for handovers to E-UTRAN 3GPP access network. The S3 reference point between the MMEs 821 and the SGSN 825 may enable user and bearer information exchange for inter-3GPP access network mobility in idle and/or active states.

The HSS 824 may comprise a database for network users, including subscription-related information to support the network entities' handling of communication sessions. The EPC 820 may comprise one or several HSSs 824, depending on the number of mobile subscribers, on the capacity of the equipment, on the organization of the network, etc. For example, the HSS 824 can provide support for routing/roaming, authentication, authorization, naming/addressing resolution, location dependencies, etc. An S6a reference point between the HSS 824 and the MMEs 821 may enable transfer of subscription and authentication data for authenticating/authorizing user access to the EPC 820 between HSS 824 and the MMEs 821.

The S-GW 822 may terminate the S1 interface 713 ("S1-U" in FIG. 8) toward the RAN 810, and routes data packets between the RAN 810 and the EPC 820. In addition, the S-GW 822 may be a local mobility anchor point for inter-RAN node handovers and also may provide an anchor for inter-3GPP mobility. Other responsibilities may include lawful intercept, charging, and some policy enforcement. The S11 reference point between the S-GW 822 and the MMEs 821 may provide a control plane between the MMEs 821 and the S-GW 822. The S-GW 822 may be coupled with the P-GW 823 via an S5 reference point.

The P-GW 823 may terminate an SGi interface toward a PDN 830. The P-GW 823 may route data packets between the EPC 820 and external networks such as a network including the application server 730 (alternatively referred to as an "AF") via an IP interface 725 (see e.g., FIG. 7). In embodiments, the P-GW 823 may be communicatively coupled to an application server (application server 730 of FIG. 7 or PDN 830 in FIG. 8) via an IP communications interface 725 (see, e.g., FIG. 7). The S5 reference point between the P-GW 823 and the S-GW 822 may provide user plane tunneling and tunnel management between the P-GW 823 and the S-GW 822. The S5 reference point may also be used for S-GW 822 relocation due to UE 801 mobility and if the S-GW 222 needs to connect to a non-collocated P-GW 823 for the required PDN connectivity. The P-GW 823 may further include a node for policy enforcement and charging data collection (e.g., PCEF (not shown)). Additionally, the SGi reference point between the P-GW 823 and the packet data network (PDN) 830 may be an operator external public, a private PDN, or an intra operator packet data network, for example, for provision of IMS services. The P-GW 823 may be coupled with a PCRF 826 via a Gx reference point.

PCRF 826 is the policy and charging control element of the EPC 820. In a non-roaming scenario, there may be a single PCRF 826 in the Home Public Land Mobile Network (HPLMN) associated with a UE 801's Internet Protocol Connectivity Access Network (IP-CAN) session. In a roaming scenario with local breakout of traffic, there may be two PCRFs associated with a UE 801's IP-CAN session, a Home PCRF (H-PCRF) within an HPLMN and a Visited PCRF (V-PCRF) within a Visited Public Land Mobile Network (VPLMN). The PCRF 826 may be communicatively coupled to the application server 830 via the P-GW 823. The application server 830 may signal the PCRF 826 to indicate a new service flow and select the appropriate QoS and charging parameters. The PCRF 826 may provision this rule into a PCEF (not shown) with the appropriate TFT and QCI, which commences the QoS and charging as specified by the application server 830. The Gx reference point between the PCRF 826 and the P-GW 823 may allow for the transfer of QoS policy and charging rules from the PCRF to PCEF in the P-GW 823. An Rx reference point may reside between the PDN 830 (or "AF 830") and the PCRF 826.

Figure 9:
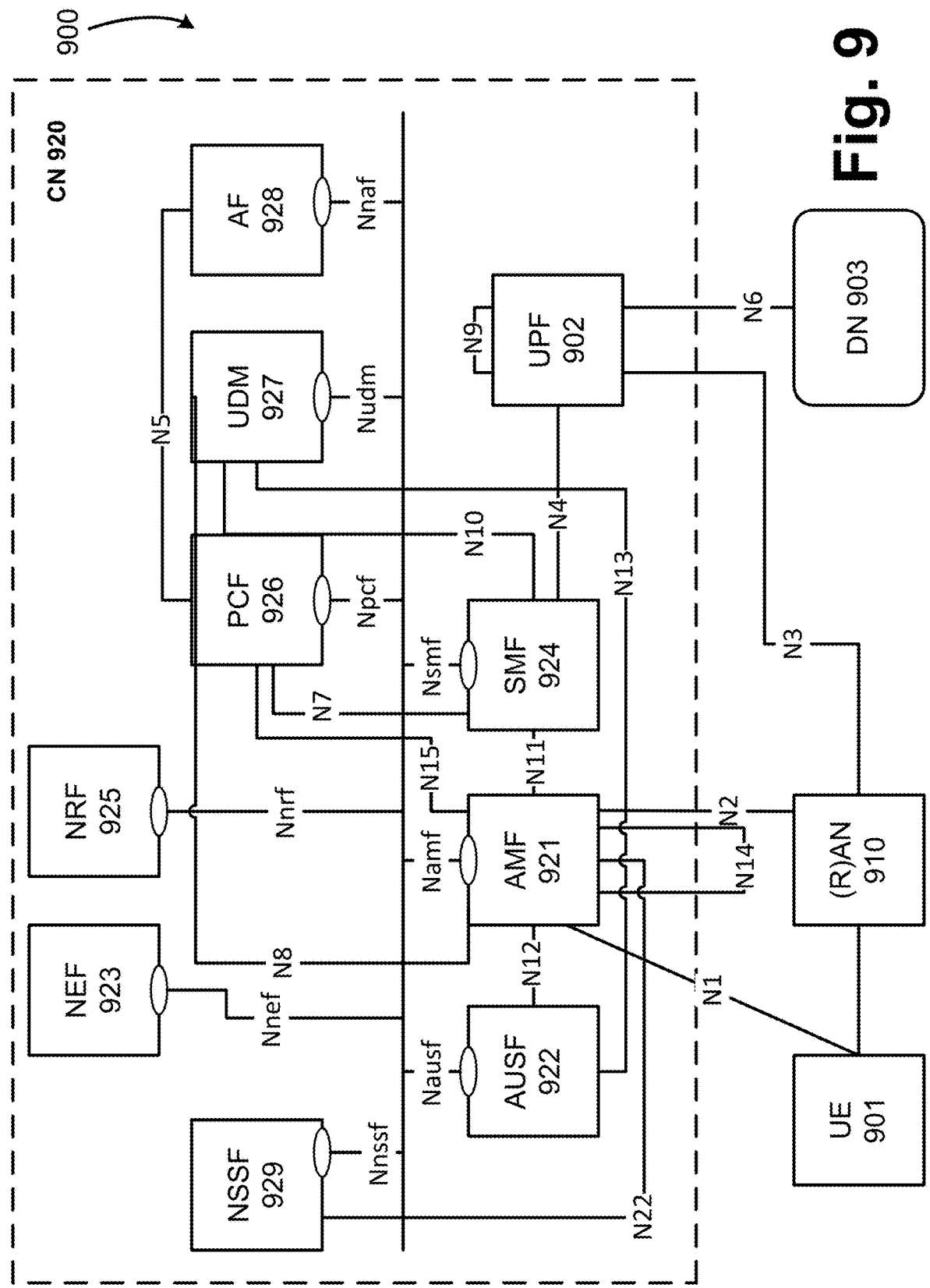
FIG. 9 illustrates an architecture of a system including a second core network in accordance with various embodiments.

FIG. 9 illustrates an architecture of a system 900 including a second CN 920 in accordance with various embodiments. The system 900 is shown to include a UE 901, which may be the same or similar to the UEs 701 and UE 801 discussed previously; a (R)AN 910, which may be the same or similar to the RAN 710 and RAN 810 discussed previously, and which may include RAN nodes 711 discussed previously; and a DN 903, which may be, for example, operator services, Internet access or 3rd party services; and a 5GC 920. The 5GC 920 may include an AUSF 922; an AMF 921; a SMF 924; a NEF 923; a PCF 926; a NRF 925; a UDM 927; an AF 928; a UPF 902; and a NSSF 929.

The UPF 902 may act as an anchor point for intra-RAT and inter-RAT mobility, an external PDU session point of interconnect to DN 903, and a branching point to support multi-homed PDU session. The UPF 902 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 902 may include an uplink classifier to support routing traffic flows to a data network. The DN 903 may represent various network operator services, Internet access, or third party services. DN 903 may include, or be similar to, application server 730 discussed previously. The UPF 902 may interact with the SMF 924 via an N4 reference point between the SMF 924 and the UPF 902.

The AUSF 922 may store data for authentication of UE 901 and handle authentication-related functionality. The AUSF 922 may facilitate a common authentication framework for various access types. The AUSF 922 may communicate with the AMF 921 via an N12 reference point between the AMF 921 and the AUSF 922; and may communicate with the UDM 927 via an N13 reference point between the UDM 927 and the AUSF 922. Additionally, the AUSF 922 may exhibit an Nausf service-based interface.

The AMF 921 may be responsible for registration management (e.g., for registering UE 901, etc.), connection management, reachability management, mobility management, and lawful interception of AMF-related events, and access authentication and authorization. The AMF 921 may be a termination point for the N11 reference point between the AMF 921 and the SMF 924. The AMF 921 may provide transport for SM messages between the UE 901 and the SMF 924, and act as a transparent proxy for routing SM messages. AMF 921 may also provide transport for SMS messages between UE 901 and an SMSF (not shown by FIG. 9). AMF 921 may act as SEAF, which may include interaction with the AUSF 922 and the UE 901, receipt of an intermediate key that was established as a result of the UE 901 authentication process. Where USIM based authentication is used, the AMF 921 may retrieve the security material from the AUSF 922. AMF 921 may also include a SCM function, which receives a key from the SEA that it uses to derive access-network specific keys. Furthermore, AMF 921 may be a termination point of a RAN CP interface, which may include or be an N2 reference point between the (R)AN 910 and the AMF 921; and the AMF 921 may be a termination point of NAS (N1) signaling, and perform NAS ciphering and integrity protection.

AMF 921 may also support NAS signaling with a UE 901 over an N3 IWF interface. The N3IWF may be used to provide access to untrusted entities. N3IWF may be a termination point for the N2 interface between the (R)AN 910 and the AMF 921 for the control plane, and may be a termination point for the N3 reference point between the (R)AN 910 and the UPF 902 for the user plane. As such, the AMF 921 may handle N2 signaling from the SMF 924 and the AMF 921 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signaling between the UE 901 and AMF 921 via an N1 reference point between the UE 901 and the AMF 921, and relay uplink and downlink user-plane packets between the UE 901 and UPF 902. The N3IWF also provides mechanisms for IPsec tunnel establishment with the UE 901. The AMF 921 may exhibit an Namf service-based interface, and may be a termination point for an N14 reference point between two AMFs 921 and an N17 reference point between the AMF 921 and a 5G-EIR (not shown by FIG. 9).

The UE 901 may need to register with the AMF 921 in order to receive network services. RM is used to register or deregister the UE 901 with the network (e.g., AMF 921), and establish a UE context in the network (e.g., AMF 921). The UE 901 may operate in an RM-REGISTERED state or an RM-DEREGISTERED state. In the RM-DEREGISTERED state, the UE 901 is not registered with the network, and the UE context in AMF 921 holds no valid location or routing information for the UE 901 so the UE 901 is not reachable by the AMF 921. In the RM-REGISTERED state, the UE 901 is registered with the network, and the UE context in AMF 921 may hold a valid location or routing information for the UE 901 so the UE 901 is reachable by the AMF 921. In the RM-REGISTERED state, the UE 901 may perform mobility Registration Update procedures, perform periodic Registration Update procedures triggered by expiration of the periodic update timer (e.g., to notify the network that the UE 901 is still active), and perform a Registration Update procedure to update UE capability information or to re-negotiate protocol parameters with the network, among others.

The AMF 921 may store one or more RM contexts for the UE 901, where each RM context is associated with a specific access to the network. The RM context may be a data structure, database object, etc. that indicates or stores, inter alia, a registration state per access type and the periodic update timer. The AMF 921 may also store a 5GC MM context that may be the same or similar to the (E)MM context discussed previously. In various embodiments, the AMF 921 may store a CE mode B Restriction parameter of the UE 901 in an associated MM context or RM context. The AMF 921 may also derive the value, when needed, from the UE's usage setting parameter already stored in the UE context (and/or MM/RM context).

CM may be used to establish and release a signaling connection between the UE 901 and the AMF 921 over the N1 interface. The signaling connection is used to enable NAS signaling exchange between the UE 901 and the CN 920, and comprises both the signaling connection between the UE and the AN (e.g., RRC connection or UE-N3IWF connection for non-3GPP access) and the N2 connection for the UE 901 between the AN (e.g., RAN 910) and the AMF 921. The UE 901 may operate in one of two CM states, CM-IDLE mode, or CM-CONNECTED mode. When the UE 901 is operating in the CM-IDLE state/mode, the UE 901 may have no NAS signaling connection established with the AMF 921 over the N1 interface, and there may be (R)AN 910 signaling connection (e.g., N2 and/or N3 connections) for the UE 901. When the UE 901 is operating in the CM-CONNECTED state/mode, the UE 901 may have an established NAS signaling connection with the AMF 921 over the N1 interface, and there may be a (R)AN 910 signaling connection (e.g., N2 and/or N3 connections) for the UE 901. Establishment of an N2 connection between the (R)AN 910 and the AMF 921 may cause the UE 901 to transition from CM-IDLE mode to CM-CONNECTED mode, and the UE 901 may transition from the CM-CONNECTED mode to the CM-IDLE mode when N2 signaling between the (R)AN 910 and the AMF 921 is released.

The SMF 924 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 901 and a data network (DN) 903 identified by a Data Network Name (DNN). PDU sessions may be established upon UE 901 request, modified upon UE 901 and 5GC 920 request, and released upon UE 901 and 5GC 920 request using NAS SM signaling exchanged over the N1 reference point between the UE 901 and the SMF 924. Upon request from an application server, the 5GC 920 may trigger a specific application in the UE 901. In response to receipt of the trigger message, the UE 901 may pass the trigger message (or relevant parts/information of the trigger message) to one or more identified applications in the UE 901. The identified application(s) in the UE 901 may establish a PDU session to a specific DNN. The SMF 924 may check whether the UE 901 requests are compliant with user subscription information associated with the UE 901. In this regard, the SMF 924 may retrieve and/or request to receive update notifications on SMF 924 level subscription data from the UDM 927.

The SMF 924 may include the following roaming functionality: handling local enforcement to apply QoS SLAB (VPLMN); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 924 may be included in the system 900, which may be between another SMF 924 in a visited network and the SMF 924 in the home network in roaming scenarios. Additionally, the SMF 924 may exhibit the Nsmf service-based interface.

The NEF 923 may provide means for securely exposing the services and capabilities provided by 3GPP network functions for third party, internal exposure/re-exposure, Application Functions (e.g., AF 928), edge computing or fog computing systems, etc. In such embodiments, the NEF 923 may authenticate, authorize, and/or throttle the AFs. NEF 923 may also translate information exchanged with the AF 928 and information exchanged with internal network functions. For example, the NEF 923 may translate between an AF-Service-Identifier and an internal 5GC information. NEF 923 may also receive information from other network functions (NFs) based on exposed capabilities of other network functions. This information may be stored at the NEF 923 as structured data, or at a data storage NF using standardized interfaces. The stored information can then be re-exposed by the NEF 923 to other NFs and AFs, and/or used for other purposes such as analytics. Additionally, the NEF 923 may exhibit an Nnef service-based interface.

The NRF 925 may support service discovery functions, receive NF discovery requests from NF instances, and provide the information of the discovered NF instances to the NF instances. NRF 925 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 925 may exhibit the Nnrf service-based interface.

The PCF 926 may provide policy rules to control plane function(s) to enforce them, and may also support unified policy framework to govern network behaviour. The PCF 926 may also implement an FE to access subscription information relevant for policy decisions in a UDR of the UDM 927. The PCF 926 may communicate with the AMF 921 via an N15 reference point between the PCF 926 and the AMF 921, which may include a PCF 926 in a visited network and the AMF 921 in case of roaming scenarios. The PCF 926 may communicate with the AF 928 via an N5 reference point between the PCF 926 and the AF 928; and with the SMF 924 via an N7 reference point between the PCF 926 and the SMF 924. The system 900 and/or CN 920 may also include an N24 reference point between the PCF 926 (in the home network) and a PCF 926 in a visited network. Additionally, the PCF 926 may exhibit an Npcf service-based interface.

The UDM 927 may handle subscription-related information to support the network entities' handling of communication sessions, and may store subscription data of UE 901. For example, subscription data may be communicated between the UDM 927 and the AMF 921 via an N8 reference point between the UDM 927 and the AMF. The UDM 927 may include two parts, an application FE and a UDR (the FE and UDR are not shown by FIG. 9). The UDR may store subscription data and policy data for the UDM 927 and the PCF 926, and/or structured data for exposure and application data (including PFDs for application detection, application request information for multiple UEs 901) for the NEF 923. The Nudr service-based interface may be exhibited by the UDR 821 to allow the UDM 927, PCF 926, and NEF 923 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 924 via an N10 reference point between the UDM 927 and the SMF 924. UDM 927 may also support SMS management, wherein an SMS-FE implements the similar application logic as discussed previously. Additionally, the UDM 927 may exhibit the Nudm service-based interface.

The AF 928 may provide application influence on traffic routing, provide access to the NCE, and interact with the policy framework for policy control. The NCE may be a mechanism that allows the 5GC 920 and AF 928 to provide information to each other via NEF 923, which may be used for edge computing implementations. In such implementations, the network operator and third party services may be hosted close to the UE 901 access point of attachment to achieve an efficient service delivery through the reduced end-to-end latency and load on the transport network. For edge computing implementations, the 5GC may select a UPF 902 close to the UE 901 and execute traffic steering from the UPF 902 to DN 903 via the N6 interface. This may be based on the UE subscription data, UE location, and information provided by the AF 928. In this way, the AF 928 may influence UPF (re)selection and traffic routing. Based on operator deployment, when AF 928 is considered to be a trusted entity, the network operator may permit AF 928 to interact directly with relevant NFs. Additionally, the AF 928 may exhibit an Naf service-based interface.

The NSSF 929 may select a set of network slice instances serving the UE 901. The NSSF 929 may also determine allowed NSSAI and the mapping to the subscribed S-NS-SAIs, if needed. The NSSF 929 may also determine the AMF set to be used to serve the UE 901, or a list of candidate AMF(s) 921 based on a suitable configuration and possibly by querying the NRF 925. The selection of a set of network slice instances for the UE 901 may be triggered by the AMF 921 with which the UE 901 is registered by interacting with the NSSF 929, which may lead to a change of AMF 921. The NSSF 929 may interact with the AMF 921 via an N22 reference point between AMF 921 and NSSF 929; and may communicate with another NSSF 929 in a visited network via an N31 reference point (not shown by FIG. 9). Additionally, the NSSF 929 may exhibit an Nnssf service-based interface.

As discussed previously, the CN 920 may include an SMSF, which may be responsible for SMS subscription checking and verification, and relaying SM messages to/from the UE 901 to/from other entities, such as an SMS-GMSC/IWMSC/SMS-router. The SMS may also interact with AMF 921 and UDM 927 for a notification procedure that the UE 901 is available for SMS transfer (e.g., set a UE not reachable flag, and notifying UDM 927 when UE 901 is available for SMS).

The CN 720 may also include other elements that are not shown by FIG. 9, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 9). Individual NFs may share a UDSF for storing their respective unstructured data or individual NFs may each have their own UDSF located at or near the individual NFs. Additionally, the UDSF may exhibit an Nudsf service-based interface (not shown by FIG. 9). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 9 for clarity. In one example, the CN 920 may include an Nx interface, which is an inter-CN interface between the MME (e.g., MME 821) and the AMF 921 in order to enable interworking between CN 920 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 10:
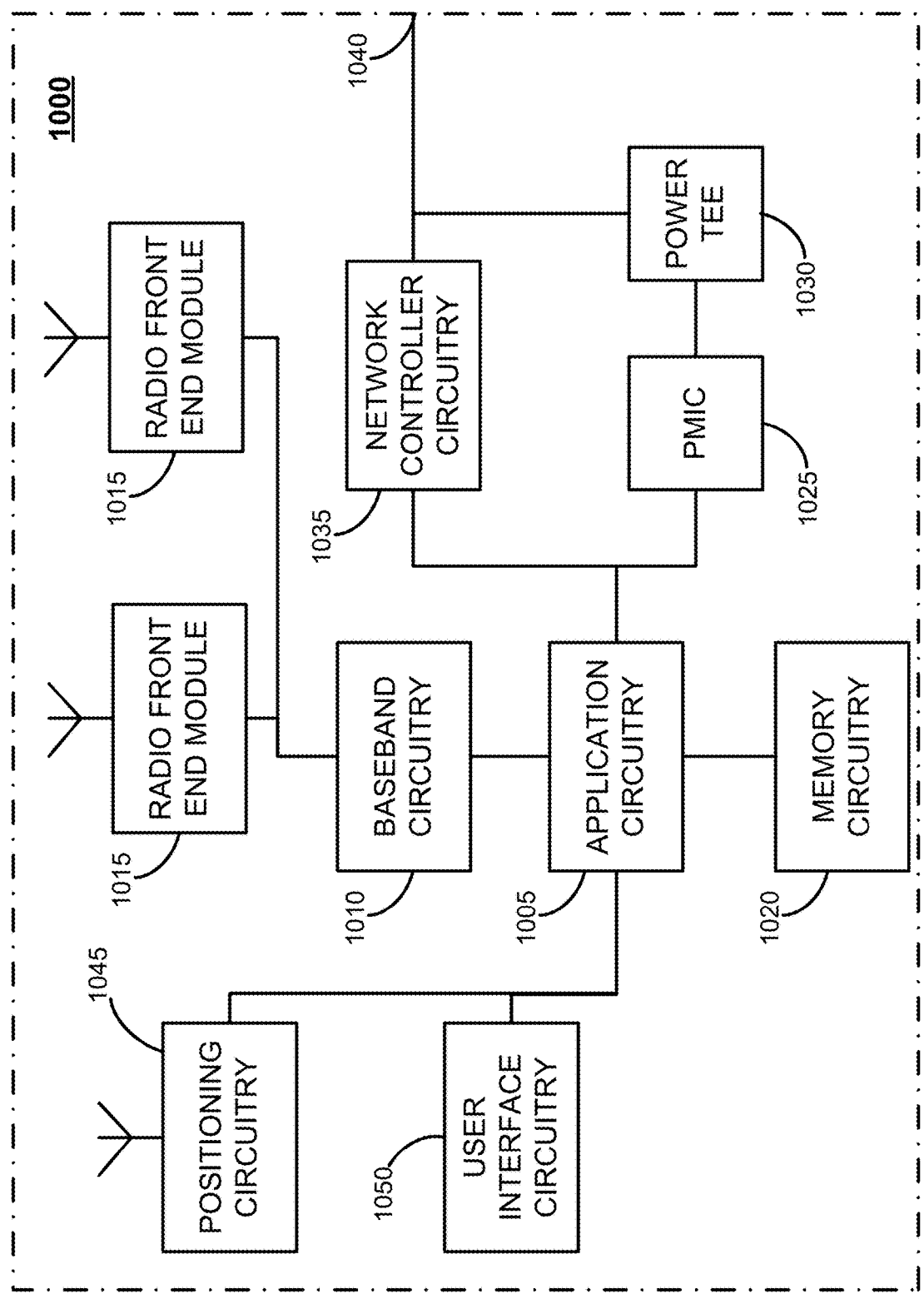
FIG. 10 illustrates an example of infrastructure equipment in accordance with various embodiments.

FIG. 10 illustrates an example of infrastructure equipment 1000 in accordance with various embodiments. The infrastructure equipment 1000 (or "system 1000") may be implemented as a base station, radio head, RAN node such as the RAN nodes 711 and/or AP 706 shown and described previously, application server(s) 730, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some embodiments, the device 1000 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1005 may comprise, or may be, a special-purpose processor/controller to operate according to the various embodiments herein. As examples, the processor(s) of application circuitry 1005 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some embodiments, the system 1000 may not utilize application circuitry 1005, and instead may include a special-purpose processor/controller to process IP data received from an EPC or 5GC, for example.

In some implementations, the application circuitry 1005 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1005 may comprise logic blocks or logic fabric, and other interconnected resources that may be programmed to perform various functions, such as the procedures, methods, functions, etc. of the various embodiments discussed herein. In such embodiments, the circuitry of application circuitry 1005 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 1010 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1010 are discussed infra with regard to FIG. 6.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 1015 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6infra), and the RFEM may be connected to multiple antennas. In alternative implementations, both mmWave and sub-mmWave radio functions may be implemented in the same physical RFEM 1015, which incorporates both mmWave antennas and sub-mmWave.

The memory circuitry 1020 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1020 may be implemented as one or more of solder down packaged integrated circuits, socketed memory modules and plug-in memory cards.

The PMIC 1025 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1030 may provide for electrical power drawn from a network cable to provide both power supply and data connectivity to the infrastructure equipment 1000 using a single cable.

The network controller circuitry 1035 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1040 using a physical connection, which may be electrical (commonly referred to as a "copper interconnect"), optical, or wireless. The network controller circuitry 1035 may include one or more dedicated processors and/or FPGAs to communicate using one or more of the aforementioned protocols. In some implementations, the network controller circuitry 1035 may include multiple controllers to provide connectivity to other networks using the same or different protocols.

The positioning circuitry 1045 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1045 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1045 may include a Micro-Technology for Positioning, Navigation, and Timing (Micro-PNT) IC that uses a master timing clock to perform position tracking/estimation without GNSS assistance. The positioning circuitry 1045 may also be part of, or interact with, the baseband circuitry 1010 and/or RFEMs 1015 to communicate with the nodes and components of the positioning network. The positioning circuitry 1045 may also provide position data and/or time data to the application circuitry 1005, which may use the data to synchronize operations with various infrastructure (e.g., RAN nodes 711, etc.), or the like.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
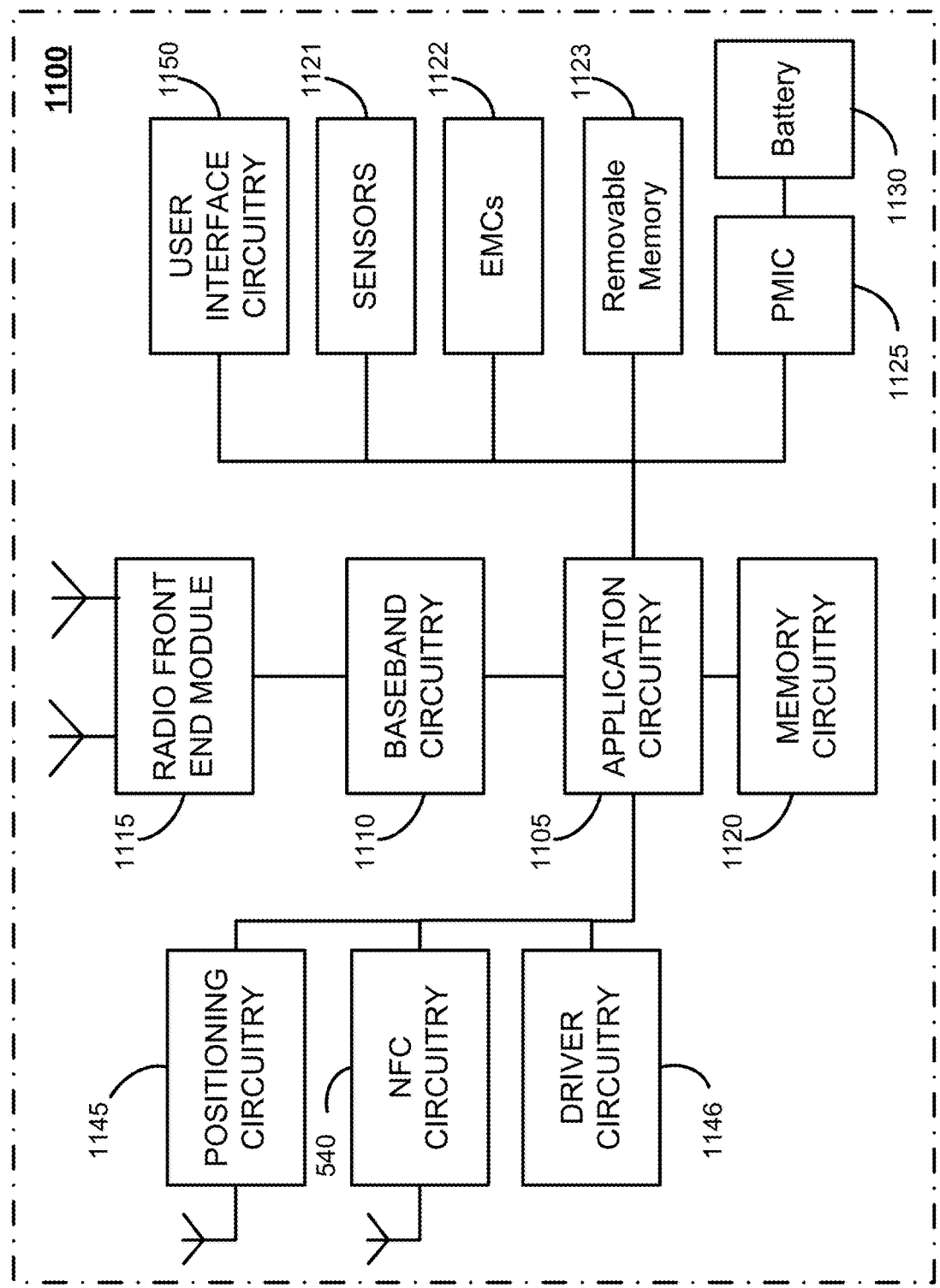
FIG. 11 illustrates an example of a platform or device in accordance with various embodiments.

FIG. 11 illustrates an example of a platform 1100 (or "device 1100") in accordance with various embodiments. In embodiments, the computer platform 1100 may be suitable for use as UEs 101, 201, 901, application servers 730, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1005 may comprise, or may be, a special-purpose processor/controller to operate according to the various embodiments herein.

As examples, the processor(s) of application circuitry 1105 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1105 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package, such as the Edison™ or Galileo™ SoC boards from Intel® Corporation.

Additionally or alternatively, application circuitry 1105 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1105 may comprise logic blocks or logic fabric, and other interconnected resources that may be programmed to perform various functions, such as the procedures, methods, functions, etc. of the various embodiments discussed herein. In such embodiments, the circuitry of application circuitry 1105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 1110 are discussed infra with regard to FIG. 6.

The RFEMs 1115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 6111 of FIG. 6infra), and the RFEM may be connected to multiple antennas. In alternative implementations, both mmWave and sub-mmWave radio functions may be implemented in the same physical RFEM 1115, which incorporates both mmWave antennas and sub-mmWave.

The memory circuitry 1120 may include any number and type of memory devices used to provide for a given amount of system memory. As examples, the memory circuitry 1120 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 1120 may be developed in accordance with a Joint Electron Devices Engineering Council (JEDEC) low power double data rate (LPDDR)-based design, such as LPDDR2, LPDDR3, LPDDR4, or the like. Memory circuitry 1120 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1120 may be on-die memory or registers associated with the application circuitry 1105. To provide for persistent storage of information such as data, applications, operating systems and so forth, memory circuitry 1120 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1100 may incorporate the three-dimensional (3D) cross-point (XPOINT) memories from Intel® and Micron®.

Removable memory circuitry 1123 may include devices, circuitry, enclosures/housings, ports, or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

The sensor circuitry 1121 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1122 include devices, modules, or subsystems whose purpose is to enable platform 1100 to change its state, position, and/or orientation, or move or control a mechanism or (sub)system. Additionally, EMCs 1122 may be configured to generate and send messages/signaling to other components of the platform 1100 to indicate a current state of the EMCs 1122. Examples of the EMCs 1122 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1100 is configured to operate one or more EMCs 1122 based on one or more captured events and/or instructions or control signals received from a service provider and/or various clients.

In some implementations, the interface circuitry may connect the platform 1100 with positioning circuitry 1145. The positioning circuitry 1145 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1145 may include a Micro-PNT IC that uses a master timing clock to perform position tracking/estimation without GNSS assistance. The positioning circuitry 1145 may also be part of, or interact with, the baseband circuitry 410 and/or RFEMs 1115 to communicate with the nodes and components of the positioning network. The positioning circuitry 1145 may also provide position data and/or time data to the application circuitry 1105, which may use the data to synchronize operations with various infrastructure (e.g., radio base stations), for turn-by-turn navigation applications, or the like In some implementations, the interface circuitry may connect the platform 1100 with Near-Field Communication (NFC) circuitry 1140. NFC circuitry 1140 is configured to provide contactless, short-range communications based on radio frequency identification (RFID) standards, wherein magnetic field induction is used to enable communication between NFC circuitry 1140 and NFC-enabled devices external to the platform 1100 (e.g., an "NFC touchpoint"). NFC circuitry 1140 comprises an NFC controller coupled with an antenna element and a processor coupled with the NFC controller. The NFC controller may be a chip/IC providing NFC functionalities to the NFC circuitry 1140 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1140, or initiate data transfer between the NFC circuitry 1140 and another active NFC device (e.g., a smartphone or an NFC-enabled POS terminal) that is proximate to the platform 1100.

The driver circuitry 1146 may include software and hardware elements that operate to control particular devices that are embedded in the platform 1100, attached to the platform 1100, or otherwise communicatively coupled with the platform 1100. The driver circuitry 1146 may include individual drivers allowing other components of the platform 1100 to interact with or control various input/output (I/O) devices that may be present within, or connected to, the platform 1100. For example, driver circuitry 1146 may include a display driver to control and allow access to a display device, a touchscreen driver to control and allow access to a touchscreen interface of the platform 1100, sensor drivers to obtain sensor readings of sensor circuitry 1121 and control and allow access to sensor circuitry 1121, EMC drivers to obtain actuator positions of the EMCs 1122 and/or control and allow access to the EMCs 1122, a camera driver to control and allow access to an embedded image capture device, audio drivers to control and allow access to one or more audio devices.

The power management integrated circuitry (PMIC) 1125 (also referred to as "power management circuitry 1125") may manage power provided to various components of the platform 1100. In particular, with respect to the baseband circuitry 1110, the PMIC 1125 may control power-source selection, voltage scaling, battery charging, or DC-to-DC conversion. The PMIC 1125 may often be included when the platform 1100 is capable of being powered by a battery 1130, for example, when the device is included in a UE 701, 201, 301.

In some embodiments, the PMIC 1125 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

In some implementations, the battery 1130 may be a "smart battery," which includes or is coupled with a Battery Management System (BMS) or battery monitoring integrated circuitry. The BMS may be included in the platform 1100 to track the state of charge (SoCh) of the battery 1130. The BMS may be used to monitor other parameters of the battery 1130 to provide failure predictions, such as the state of health (SoH) and the state of function (SoF) of the battery 1130. The BMS may communicate the information of the battery 1130 to the application circuitry 1105 or other components of the platform 1100. The BMS may also include an analog-to-digital (ADC) convertor that allows the application circuitry 1105 to directly monitor the voltage of the battery 1130 or the current flow from the battery 1130. The battery parameters may be used to determine actions that the platform 1100 may perform, such as transmission frequency, network operation, sensing frequency, and the like.

A power block, or other power supply coupled to an electrical grid may be coupled with the BMS to charge the battery 1130. In some examples, the power block may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1130, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1150 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1150 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensor circuitry 1121 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 12:
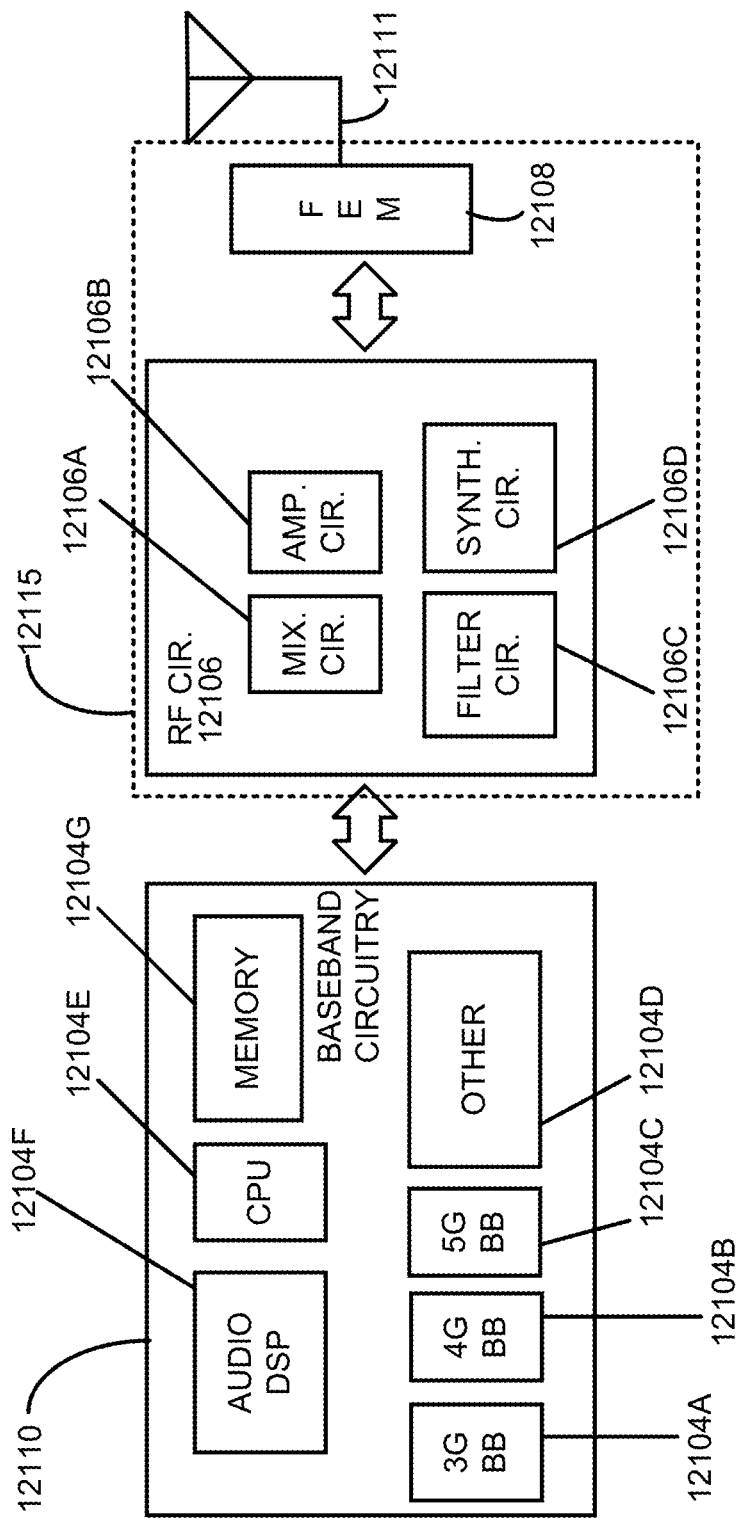
FIG. 12 illustrates example components of baseband circuitry and radio front end modules (RFEM) in accordance with various embodiments.

FIG. 12 illustrates example components of baseband circuitry 12110 and radio front end modules (RFEM) 12115 in accordance with various embodiments. The baseband circuitry 12110 corresponds to the baseband circuitry 410 and 1110 of FIGS. 4 and 11, respectively. The RFEM 12115 corresponds to the RFEM 415 and 1115 of FIGS. 4 and 11, respectively. As shown, the RFEMs 12115 may include Radio Frequency (RF) circuitry 12106, front-end module (FEM) circuitry 12108, antenna array 12111 coupled together at least as shown.

The baseband circuitry 12110 includes circuitry and/or control logic configured to carry out various radio/network protocol and radio control functions that enable communication with one or more radio networks via the RF circuitry 12106. The radio control functions may include, but are not limited to, signal modulation/demodulation, encoding/decoding, radio frequency shifting, etc. In some embodiments, modulation/demodulation circuitry of the baseband circuitry 12110 may include Fast-Fourier Transform (FFT), precoding, or constellation mapping/demapping functionality. In some embodiments, encoding/decoding circuitry of the baseband circuitry 12110 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 12110 is configured to process baseband signals received from a receive signal path of the RF circuitry 12106 and to generate baseband signals for a transmit signal path of the RF circuitry 12106. The baseband circuitry 12110 is configured to interface with application circuitry 1005/1105 (see FIGS. 4 and 11) for generation and processing of the baseband signals and for controlling operations of the RF circuitry 12106. The baseband circuitry 12110 may handle various radio control functions.

The aforementioned circuitry and/or control logic of the baseband circuitry 12110 may include one or more single or multi-core processors. For example, the one or more processors may include a 3G baseband processor 12104A, a 4G/LTE baseband processor 12104B, a 5G/NR baseband processor 12104C, or some other baseband processor(s) 12104D for other existing generations, generations in development or to be developed in the future (e.g., sixth generation (6G), etc.). In other embodiments, some or all of the functionality of baseband processors 12104A-D may be included in modules stored in the memory 12104G and executed via a Central Processing Unit (CPU) 12104E. In other embodiments, some or all of the functionality of baseband processors 12104A-D may be provided as hardware accelerators (e.g., FPGAs, ASICs, etc.) loaded with the appropriate bit streams or logic blocks stored in respective memory cells. In various embodiments, the memory 12104G may store program code of a real-time OS (RTOS), which when executed by the CPU 12104E (or other baseband processor), is to cause the CPU 12104E (or other baseband processor) to manage resources of the baseband circuitry 12110, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 12110 includes one or more audio digital signal processor(s) (DSP) 12104F. The audio DSP(s) 12104F include elements for compression/decompression and echo cancellation and may include other suitable processing elements in other embodiments.

In some embodiments, each of the processors 12104A-12104E include respective memory interfaces to send/receive data to/from the memory 12104G. The baseband circuitry 12110 may further include one or more interfaces to communicatively couple to other circuitries/devices, such as an interface to send/receive data to/from memory external to the baseband circuitry 12110; an application circuitry interface to send/receive data to/from the application circuitry 1005/1105 of FIG. 4-XT); an RF circuitry interface to send/receive data to/from RF circuitry 12106 of FIG. 12; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 1125.

In alternate embodiments (which may be combined with the above described embodiments), baseband circuitry 12110 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 12110 may include protocol processing circuitry with one or more instances of control circuitry (not shown) to provide control functions for the digital baseband circuitry and/or radio frequency circuitry (e.g., the radio front end modules 12115).

Although not shown by FIG. 12, in some embodiments, the baseband circuitry 12110 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 12110 and/or RF circuitry 12106 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 12110 and/or RF circuitry 12106 are part of a Wi-Fi communication system. In the second example, the protocol processing circuitry would operate Wi-Fi MAC and logical link control (LLC) functions. The protocol processing circuitry may include one or more memory structures (e.g., 12104G) to store program code and data for operating the protocol functions, as well as one or more processing cores to execute the program code and perform various operations using the data. The baseband circuitry 12110 may also support radio communications for more than one wireless protocol.

The various hardware elements of the baseband circuitry 12110 discussed herein may be implemented, for example, as a solder-down substrate including one or more integrated circuits (ICs), a single packaged IC soldered to a main circuit board or a multi-chip module containing two or more ICs. In one example, the components of the baseband circuitry 12110 may be suitably combined in a single chip or chipset, or disposed on a same circuit board. In another example, some or all of the constituent components of the baseband circuitry 12110 and RF circuitry 12106 may be implemented together such as, for example, a system on a chip (SoC) or System-in-Package (SiP). In another example, some or all of the constituent components of the baseband circuitry 12110 may be implemented as a separate SoC that is communicatively coupled with and RF circuitry 12106 (or multiple instances of RF circuitry 12106). In yet another example, some or all of the constituent components of the baseband circuitry 12110 and the application circuitry 1005/505 may be implemented together as individual SoCs mounted to a same circuit board (e.g., a "multi-chip package").

In some embodiments, the baseband circuitry 12110 may provide for communication compatible with one or more radio technologies. For example, in some embodiments, the baseband circuitry 12110 may support communication with an E-UTRAN or other WMAN, a WLAN, a WPAN. Embodiments in which the baseband circuitry 12110 is configured to support radio communications of more than one wireless protocol may be referred to as multi-mode baseband circuitry.

RF circuitry 12106 may enable communication with wireless networks using modulated electromagnetic radiation through a non-solid medium. In various embodiments, the RF circuitry 12106 may include switches, filters, amplifiers, etc. to facilitate the communication with the wireless network. RF circuitry 12106 may include a receive signal path, which may include circuitry to down-convert RF signals received from the FEM circuitry 12108 and provide baseband signals to the baseband circuitry 12110. RF circuitry 12106 may also include a transmit signal path, which may include circuitry to up-convert baseband signals provided by the baseband circuitry 12110 and provide RF output signals to the FEM circuitry 12108 for transmission.

In some embodiments, the receive signal path of the RF circuitry 12106 may include mixer circuitry 12106a, amplifier circuitry 12106b and filter circuitry 12106c. In some embodiments, the transmit signal path of the RF circuitry 12106 may include filter circuitry 12106c and mixer circuitry 12106a. RF circuitry 12106 may also include synthesizer circuitry 12106d for synthesizing a frequency for use by the mixer circuitry 12106a of the receive signal path and the transmit signal path. In some embodiments, the mixer circuitry 12106a of the receive signal path may be configured to down-convert RF signals received from the FEM circuitry 12108 based on the synthesized frequency provided by synthesizer circuitry 12106d. The amplifier circuitry 12106b may be configured to amplify the down-converted signals and the filter circuitry 12106c may be a low-pass filter (LPF) or band-pass filter (BPF) configured to remove unwanted signals from the down-converted signals to generate output baseband signals. Output baseband signals may be provided to the baseband circuitry 12110 for further processing. In some embodiments, the output baseband signals may be zero-frequency baseband signals, although this is not a requirement. In some embodiments, mixer circuitry 12106a of the receive signal path may comprise passive mixers, although the scope of the embodiments is not limited in this respect.

In some embodiments, the mixer circuitry 12106a of the transmit signal path may be configured to up-convert input baseband signals based on the synthesized frequency provided by the synthesizer circuitry 12106d to generate RF output signals for the FEM circuitry 12108. The baseband signals may be provided by the baseband circuitry 12110 and may be filtered by filter circuitry 12106c.

In some embodiments, the mixer circuitry 12106a of the receive signal path and the mixer circuitry 12106a of the transmit signal path may include two or more mixers and may be arranged for quadrature downconversion and upconversion, respectively. In some embodiments, the mixer circuitry 12106a of the receive signal path and the mixer circuitry 12106a of the transmit signal path may include two or more mixers and may be arranged for image rejection (e.g., Hartley image rejection). In some embodiments, the mixer circuitry 12106a of the receive signal path and the mixer circuitry 12106a of the transmit signal path may be arranged for direct downconversion and direct upconversion, respectively. In some embodiments, the mixer circuitry 12106a of the receive signal path and the mixer circuitry 12106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 12106 may include analog-to-digital converter (ADC) and digital-to-analog converter (DAC) circuitry and the baseband circuitry 12110 may include a digital baseband interface to communicate with the RF circuitry 12106.

In some dual-mode embodiments, a separate radio IC circuitry may be provided for processing signals for each spectrum, although the scope of the embodiments is not limited in this respect.

In some embodiments, the synthesizer circuitry 12106d may be a fractional-N synthesizer or a fractional N/N+1 synthesizer, although the scope of the embodiments is not limited in this respect as other types of frequency synthesizers may be suitable. For example, synthesizer circuitry 12106d may be a delta-sigma synthesizer, a frequency multiplier, or a synthesizer comprising a phase-locked loop with a frequency divider.

The synthesizer circuitry 12106d may be configured to synthesize an output frequency for use by the mixer circuitry 12106a of the RF circuitry 12106 based on a frequency input and a divider control input. In some embodiments, the synthesizer circuitry 12106d may be a fractional N/N+1 synthesizer.

In some embodiments, frequency input may be provided by a voltage controlled oscillator (VCO), although that is not a requirement. Divider control input may be provided by either the baseband circuitry 12110 or the application circuitry 1005/505 depending on the desired output frequency. In some embodiments, a divider control input (e.g., N) may be determined from a look-up table based on a channel indicated by the application circuitry 1005/505.

Synthesizer circuitry 12106d of the RF circuitry 12106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 12106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 12106 may include an IQ/polar converter.

FEM circuitry 12108 may include a receive signal path, which may include circuitry configured to operate on RF signals received from antenna array 12111, amplify the received signals and provide the amplified versions of the received signals to the RF circuitry 12106 for further processing. FEM circuitry 12108 may also include a transmit signal path, which may include circuitry configured to amplify signals for transmission provided by the RF circuitry 12106 for transmission by one or more of antenna elements of antenna array 12111. In various embodiments, the amplification through the transmit or receive signal paths may be done solely in the RF circuitry 12106, solely in the FEM circuitry 12108, or in both the RF circuitry 12106 and the FEM circuitry 12108.

In some embodiments, the FEM circuitry 12108 may include a TX/RX switch to switch between transmit mode and receive mode operation. The FEM circuitry 12108 may include a receive signal path and a transmit signal path. The receive signal path of the FEM circuitry 12108 may include an LNA to amplify received RF signals and provide the amplified received RF signals as an output (e.g., to the RF circuitry 12106). The transmit signal path of the FEM circuitry 12108 may include a power amplifier (PA) to amplify input RF signals (e.g., provided by RF circuitry 12106), and one or more filters to generate RF signals for subsequent transmission by one or more antenna elements of the antenna array 12111.

The antenna array 12111 comprises one or more antenna elements, each of which is configured convert electrical signals into radio waves to travel through the air and to convert received radio waves into electrical signals. For example, digital baseband signals provided by the baseband circuitry 12110 is converted into analog RF signals (e.g., modulated waveform) that will be amplified and transmitted via the antenna elements of the antenna array 12111 including one or more antenna elements (not shown). The antenna elements may be omnidirectional, direction, or a combination thereof. The antenna elements may be formed in a multitude of arranges as are known and/or discussed herein. The antenna array 12111 may comprise microstrip antennas or printed antennas that are fabricated on the surface of one or more printed circuit boards. The antenna array 12111 may be formed in as a patch of metal foil (e.g., a patch antenna) in a variety of shapes, and may be coupled with the RF circuitry 12106 and/or FEM circuitry 12108 using metal transmission lines or the like.

Processors of the application circuitry 1005/505 and processors of the baseband circuitry 12110 may be used to execute elements of one or more instances of a protocol stack. For example, processors of the baseband circuitry 12110, alone or in combination, may be used execute Layer 3, Layer 2, or Layer 1 functionality, while processors of the application circuitry 1005/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 13:
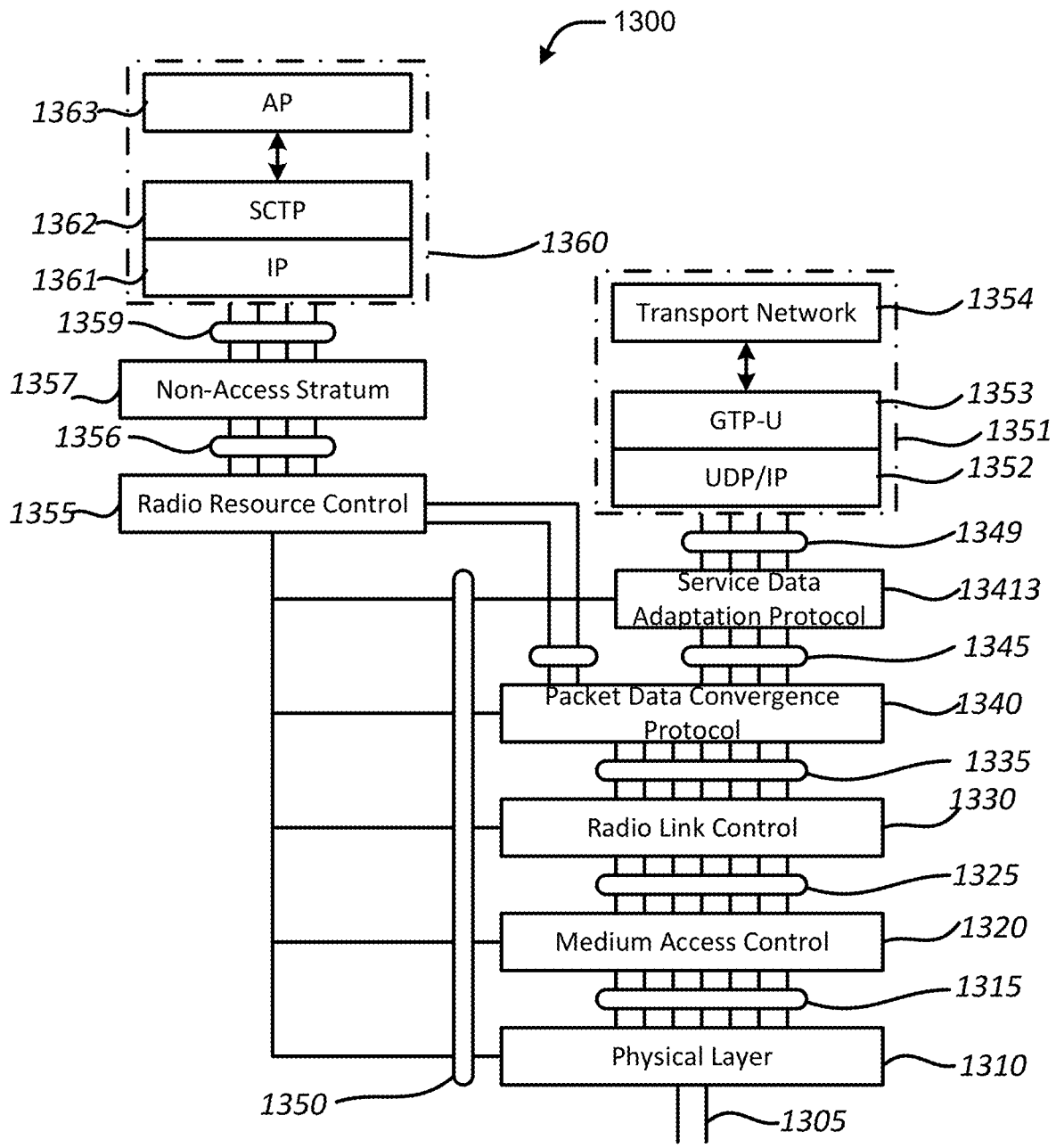
FIG. 13 illustrates various protocol functions that may be implemented in a wireless communication device according to various embodiments.

FIG. 13 illustrates various protocol functions that may be implemented in a wireless communication device according to various embodiments. In particular, FIG. 13 includes an arrangement 1300 showing interconnections between various protocol layers/entities. The following description of FIG. 13 is provided for various protocol layers/entities that operate in conjunction with the 5G/NR system standards and LTE system standards, but some or all of the aspects of FIG. 13 may be applicable to other wireless communication network systems as well.

The protocol layers of arrangement 1300 may include one or more of PHY 1310, MAC 1320, RLC 1330, PDCP 1340, SDAP 1347, RRC 1355, and NAS layer 1357, in addition to other higher layer functions not illustrated. The protocol layers may include one or more service access points (e.g., items 1359, 1356, 1350, 1349, 1345, 1335, 1325, and 1315 in FIG. 13) that may provide communication between two or more protocol layers.

The PHY 1310 may transmit and receive physical layer signals 1305 that may be received from or transmitted to one or more other communication devices. The physical layer signals 1305 may comprise one or more physical channels, such as those discussed herein. The PHY 1310 may further perform link adaptation or adaptive modulation and coding (AMC), power control, cell search (e.g., for initial synchronization and handover purposes), and other measurements used by higher layers, such as the RRC 1355. The PHY 1310 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 1310 may process requests from and provide indications to an instance of MAC 1320 via one or more PHY-SAP 1315. According to some embodiments, requests and indications communicated via PHY-SAP 1315 may comprise one or more transport channels.

Instance(s) of MAC 1320 may process requests from, and provide indications to, an instance of RLC 1330 via one or more MAC-SAPS 1325. These requests and indications communicated via the MAC-SAP 1325 may comprise one or more logical channels. The MAC 1320 may perform mapping between the logical channels and transport channels, multiplexing of MAC SDUs from one or more logical channels onto TBs to be delivered to PHY 1310 via the transport channels, de-multiplexing MAC SDUs to one or more logical channels from TBs delivered from the PHY 1310 via transport channels, multiplexing MAC SDUs onto TBs, scheduling information reporting, error correction through HARQ, and logical channel prioritization.

Instance(s) of RLC 1330 may process requests from and provide indications to an instance of PDCP 1340 via one or more radio link control service access points (RLC-SAP) 1335. These requests and indications communicated via RLC-SAP 1335 may comprise one or more RLC channels. The RLC 1330 may operate in a plurality of modes of operation, including: Transparent Mode (TM), Unacknowledged Mode (UM), and Acknowledged Mode (AM). The RLC 1330 may execute transfer of upper layer protocol data units (PDUs), error correction through automatic repeat request (ARQ) for AM data transfers, and concatenation, segmentation and reassembly of RLC SDUs for UM and AM data transfers. The RLC 1330 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 1340 may process requests from and provide indications to instance(s) of RRC 1355 and/or instance(s) of SDAP 1347 via one or more packet data convergence protocol service access points (PDCP-SAP) 1345. These requests and indications communicated via PDCP-SAP 1345 may comprise one or more radio bearers. The PDCP 1340 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 1347 may process requests from and provide indications to one or more higher layer protocol entities via one or more SDAP-SAP 1349. These requests and indications communicated via SDAP-SAP 1349 may comprise one or more QoS flows. The SDAP 1347 may map QoS flows to DRBs, and vice versa, and may also mark QFIs in DL and UL packets. A single SDAP entity 1347 may be configured for an individual PDU session. In the UL direction, the NG-RAN 710 may control the mapping of QoS Flows to DRB(s) in two different ways, reflective mapping or explicit mapping. For reflective mapping, the SDAP 1347 of a UE 701 may monitor the QFIs of the DL packets for each DRB, and may apply the same mapping for packets flowing in the UL direction. For a DRB, the SDAP 1347 of the UE 701 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 1355 configuring the SDAP 1347 with an explicit QoS flow to DRB mapping rule, which may be stored and followed by the SDAP 1347. In embodiments, the SDAP 1347 may only be used in NR implementations and may not be used in LTE implementations.

The RRC 1355 may configure, via one or more management service access points (M-SAP), aspects of one or more protocol layers, which may include one or more instances of PHY 1310, MAC 1320, RLC 1330, PDCP 1340 and SDAP 1347. In embodiments, an instance of RRC 1355 may process requests from and provide indications to one or more NAS entities 1357 via one or more RRC-SAPS 1356. The main services and functions of the RRC 1355 may include broadcast of system information (e.g., included in MIBs or SIBs related to the NAS), broadcast of system information related to the access stratum (AS), paging, establishment, maintenance and release of an RRC connection between the UE 701 and RAN 710 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 1357 may form the highest stratum of the control plane between the UE 701 and the AMF 921. The NAS 1357 may support the mobility of the UEs 101 and the session management procedures to establish and maintain IP connectivity between the UE 701 and a P-GW in LTE systems.

According to various embodiments, one or more protocol entities of arrangement 1300 may be implemented in UEs 101, RAN nodes 711, AMF 921 in NR implementations or MME 821 in LTE implementations, UPF 302 in NR implementations or S-GW 822 and P-GW 823 in LTE implementations, or the like to be used for control plane or user plane communications protocol stack between the aforementioned devices. In such embodiments, one or more protocol entities that may be implemented in one or more of UE 701, gNB 111, AMF 921, etc. may communicate with a respective peer protocol entity that may be implemented in or on another device using the services of respective lower layer protocol entities to perform such communication. In some embodiments, a gNB-CU of the gNB 111 may host the RRC 1355, SDAP 1347, and PDCP 1340 of the gNB that controls the operation of one or more gNB-DUs, and the gNB-DUs of the gNB 111 may each host the RLC 1330, MAC 1320, and PHY 1310 of the gNB 111.

In a first example, a control plane protocol stack may comprise, in order from highest layer to lowest layer, NAS 1357, RRC 1355, PDCP 1340, RLC 1330, MAC 1320, and PHY 1310. In this example, upper layers 1360 may be built on top of the NAS 1357, which includes an IP layer 1361, an SCTP 1362, and an application layer signaling protocol (AP) 1363.

In NR implementations, the AP 1363 may be an NG application protocol layer (NGAP or NG-AP) 1363 for the NG interface 113 defined between the NG-RAN node 711 and the AMF 921, or the AP 1363 may be an Xn application protocol layer (XnAP or Xn-AP) 1363 for the Xn interface 112 that is defined between two or more RAN nodes 711.

The NG-AP 1363 may support the functions of the NG interface 113 and may comprise Elementary Procedures (EPs). An NG-AP EP may be a unit of interaction between the NG-RAN node 711 and the AMF 921. The NG-AP 1363 services may comprise two groups: UE-associated services (e.g., services related to a UE 701) and non-UE-associated services (e.g., services related to the whole NG interface instance between the NG-RAN node 711 and AMF 921). These services may include functions including, but not limited to: a paging function for the sending of paging requests to NG-RAN nodes 711 involved in a particular paging area; a UE context management function for allowing the AMF 921 to establish, modify, and/or release a UE context in the AMF 921 and the NG-RAN node 711; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 701 and AMF 921; a NAS node selection function for determining an association between the AMF 921 and the UE 701; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 711 via CN 720; and/or other like functions.

The XnAP 1363 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 810), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 701, such as Xn interface setup and reset procedures, NG-RAN update procedures, cell activation procedures, and the like.

In LTE implementations, the AP 1363 may be an S1 Application Protocol layer (S1-AP) 1363 for the S1 interface 113 defined between an E-UTRAN node 711 and an MME, or the AP 1363 may be an X2 application protocol layer (X2AP or X2-AP) 1363 for the X2 interface 112 that is defined between two or more E-UTRAN nodes 711.

The S1 Application Protocol layer (S1-AP) 1363 may support the functions of the S1 interface, and similar to the NG-AP discussed previously, the S1-AP may comprise S1-AP EPs. An S1-AP EP may be a unit of interaction between the E-UTRAN node 711 and an MME 821within an LTE CN 720. The S1-AP 1363 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 1363 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 701, such as X2 interface setup and reset procedures, load indication procedures, error indication procedures, cell activation procedures, and the like.

The SCTP layer (alternatively referred to as the SCTP/IP layer) 1362 may provide guaranteed delivery of application layer messages (e.g., NGAP or XnAP messages in NR implementations, or S1-AP or X2AP messages in LTE implementations). The SCTP 1362 may ensure reliable delivery of signaling messages between the RAN node 711 and the AMF 921/MME 821 based, in part, on the IP protocol, supported by the IP 1361. The Internet Protocol layer (IP) 1361 may be used to perform packet addressing and routing functionality. In some implementations the IP layer 1361 may use point-to-point transmission to deliver and convey PDUs. In this regard, the RAN node 711 may comprise L2 and L1 layer communication links (e.g., wired or wireless) with the MME/AMF to exchange information.

In a second example, a user plane protocol stack may comprise, in order from highest layer to lowest layer, SDAP 1347, PDCP 1340, RLC 1330, MAC 1320, and PHY 1310. The user plane protocol stack may be used for communication between the UE 701, the RAN node 711, and UPF 302 in NR implementations or an S-GW 822 and P-GW 823 in LTE implementations. In this example, upper layers 1351 may be built on top of the SDAP 1347, and may include a user datagram protocol (UDP) and IP security layer (UDP/IP) 1352, a General Packet Radio Service (GPRS) Tunneling Protocol for the user plane layer (GTP-U) 1353, and a User Plane PDU layer (UP PDU) 1363.

The transport network layer 1354 (also referred to as a "transport layer") may be built on IP transport, and the GTP-U 1353 may be used on top of the UDP/IP layer 1352 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 1353 may be used for carrying user data within the GPRS core network and between the radio access network and the core network. The user data transported can be packets in any of IPv4, IPv6, or PPP formats, for example. The UDP/IP 1352 may provide checksums for data integrity, port numbers for addressing different functions at the source and destination, and encryption and authentication on the selected data flows. The RAN node 711 and the S-GW 822 may utilize an S1-U interface to exchange user plane data via a protocol stack comprising an L1 layer (e.g., PHY 1310), an L2 layer (e.g., MAC 1320, RLC 1330, PDCP 1340, and/or SDAP 1347), the UDP/IP layer 1352, and the GTP-U 1353. The S-GW 822 and the P-GW 823 may utilize an S5/S8a interface to exchange user plane data via a protocol stack comprising an L1 layer, an L2 layer, the UDP/IP layer 1352, and the GTP-U 1353. As discussed previously, NAS protocols may support the mobility of the UE 701 and the session management procedures to establish and maintain IP connectivity between the UE 701 and the P-GW 823.

Moreover, although not shown by FIG. 13, an application layer may be present above the AP 1363 and/or the transport network layer 1354. The application layer may be a layer in which a user of the UE 701, RAN node 711, or other network element interacts with software applications being executed, for example, by application circuitry 405 or application circuitry 505, respectively. The application layer may also provide one or more interfaces for software applications to interact with communications systems of the UE 701 or RAN node 711, such as the baseband circuitry 6110. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 14:
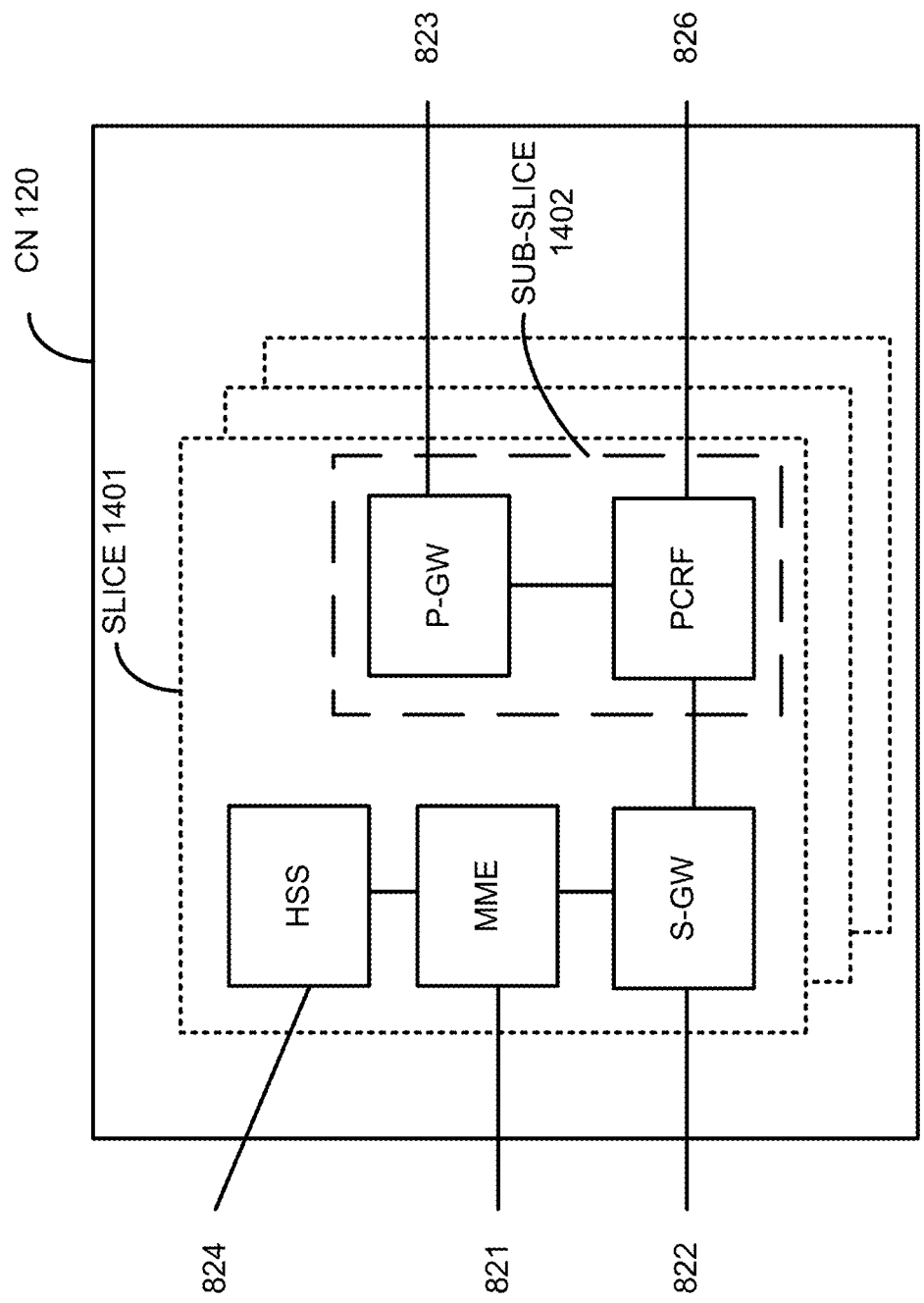
FIG. 14 illustrates components of a core network in accordance with various embodiments.

FIG. 14 illustrates components of a core network in accordance with various embodiments. The components of the CN 6120 may be implemented in one physical node or separate physical nodes including components to read and execute instructions from a machine-readable or computer-readable medium (e.g., a non-transitory machine-readable storage medium). In embodiments, the components of CN 6220 may be implemented in a same or similar manner as discussed herein with regard to the components of CN 6120. In some embodiments, NFV is utilized to virtualize any or all of the above-described network node functions via executable instructions stored in one or more computer-readable storage mediums (described in further detail below). A logical instantiation of the CN 6120 may be referred to as a network slice 1401, and individual logical instantiations of the CN 6120 may provide specific network capabilities and network characteristics. A logical instantiation of a portion of the CN 6120 may be referred to as a network sub-slice 1402 (e.g., the network sub-slice 1402 is shown to include the P-GW 6123 and the PCRF 6126).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 9), a network slice always comprises a RAN part and a CN part. The support of network slicing relies on the principle that traffic for different slices is handled by different PDU sessions. The network can realize the different network slices by scheduling and also by providing different L1/L2 configurations. The UE 901 provides assistance information for network slice selection in an appropriate RRC message, if it has been provided by NAS. While the network can support large number of slices, the UE need not support more than 8 slices simultaneously.

A network slice may include the CN 820 control plane and user plane NFs, NG-RANs 810 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 801 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 821 instance serving an individual UE 801 may belong to each of the network slice instances serving that UE.

Network Slicing in the NG-RAN 810 involves RAN slice awareness. RAN slice awareness includes differentiated handling of traffic for different network slices, which have been pre-configured. Slice awareness in the NG-RAN 810 is introduced at the PDU session level by indicating the S-NSSAI corresponding to a PDU session in all signaling that includes PDU session resource information. How the NG-RAN 810 supports the slice enabling in terms of NG- RAN functions (e.g., the set of network functions that comprise each slice) is implementation dependent. The NG-RAN 810 selects the RAN part of the network slice using assistance information provided by the UE 801 or the 5GC 820, which unambiguously identifies one or more of the pre-configured network slices in the PLMN. The NG-RAN 810 also supports resource management and policy enforcement between slices as per SLAs. A single NG-RAN node may support multiple slices, and the NG-RAN 810 may also apply an appropriate RRM policy for the SLA in place to each supported slice. The NG-RAN 810 may also support QoS differentiation within a slice.

The NG-RAN 810 may also use the UE assistance information for the selection of an AMF 821 during an initial attach, if available. The NG-RAN 810 uses the assistance information for routing the initial NAS to an AMF 821. If the NG-RAN 810 is unable to select an AMF 821 using the assistance information, or the UE 801 does not provide any such information, the NG-RAN 810 sends the NAS signaling to a default AMF 821, which may be among a pool of AMFs 821. For subsequent accesses, the UE 801 provides a temp ID, which is assigned to the UE 801 by the 5GC 820, to enable the NG-RAN 810 to route the NAS message to the appropriate AMF 821 as long as the temp ID is valid. The NG-RAN 810 is aware of, and can reach, the AMF 821 that is associated with the temp ID. Otherwise, the method for initial attach applies.

The NG-RAN 810 supports resource isolation between slices. NG-RAN 810 resource isolation may be achieved by means of RRM policies and protection mechanisms that should avoid that shortage of shared resources if one slice breaks the service level agreement for another slice. In some implementations, it is possible to fully dedicate NG-RAN 810 resources to a certain slice. How NG-RAN 810 supports resource isolation is implementation dependent.

Some slices may be available only in part of the network. Awareness in the NG-RAN 810 of the slices supported in the cells of its neighbors may be beneficial for inter-frequency mobility in connected mode. The slice availability may not change within the UE's registration area. The NG-RAN 810 and the 5GC 820 are responsible to handle a service request for a slice that may or may not be available in a given area. Admission or rejection of access to a slice may depend on factors such as support for the slice, availability of resources, support of the requested service by NG-RAN 810.

The UE 801 may be associated with multiple network slices simultaneously. In case the UE 801 is associated with multiple slices simultaneously, only one signaling connection is maintained, and for intra-frequency cell reselection, the UE 801 tries to camp on the best cell. For inter-frequency cell reselection, dedicated priorities can be used to control the frequency on which the UE 801 camps. The 5GC 820 is to validate that the UE 801 has the rights to access a network slice. Prior to receiving an Initial Context Setup Request message, the NG-RAN 810 may be allowed to apply some provisional/local policies, based on awareness of a particular slice that the UE 801 is requesting to access. During the initial context setup, the NG-RAN 810 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 15:
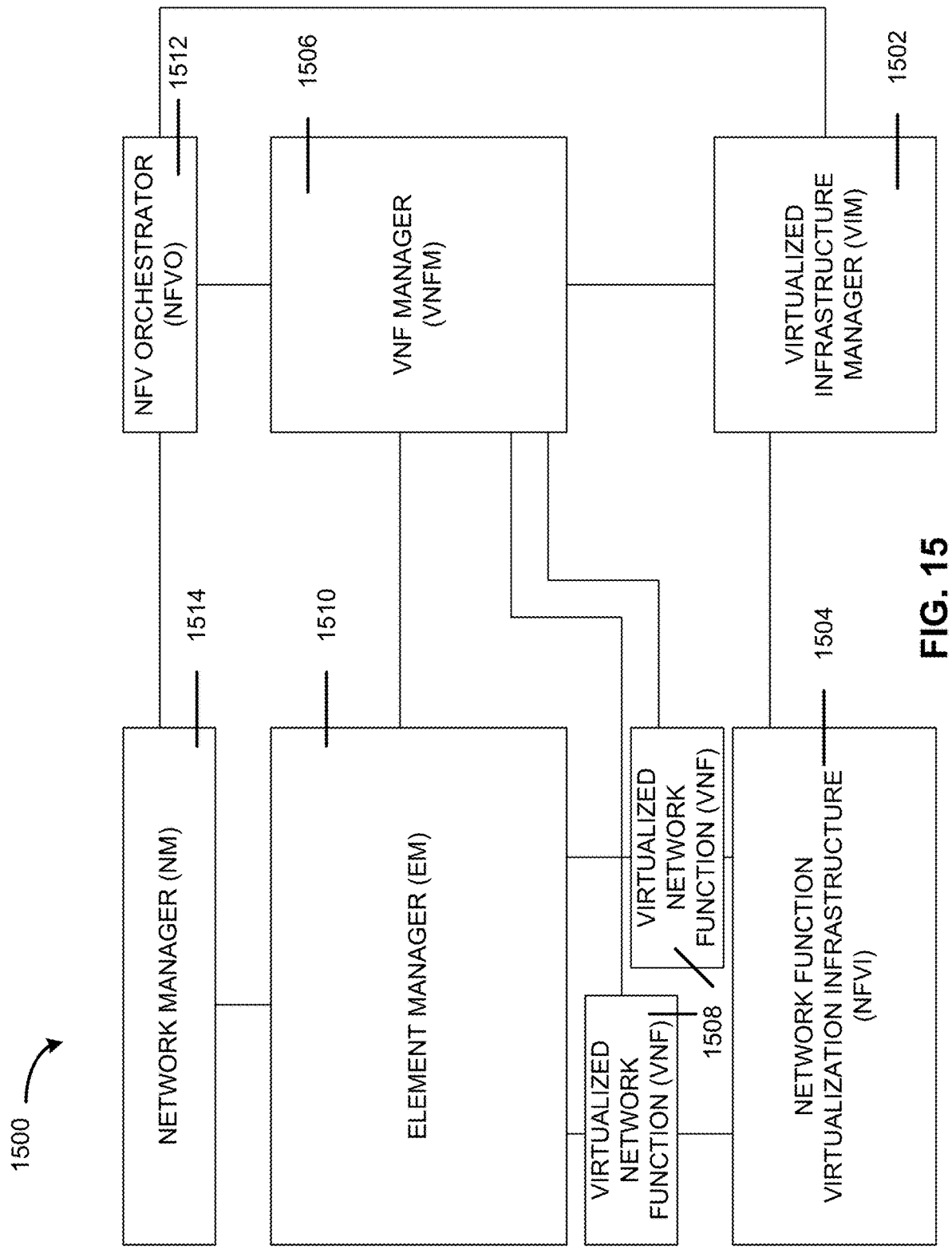
FIG. 15 is a block diagram illustrating components, according to some example embodiments, of a system 800 to support NFV.

FIG. 15 is a block diagram illustrating components, according to some example embodiments, of a system 1500 to support NFV. The system 1500 is illustrated as including a VIM 1502, an NFVI 1504, an VNFM 1506, VNFs 1508, an EM 1510, an NFVO 1512, and a NM 1514. The VIM 1502 manages the resources of the NFVI 1504. The NFVI 1504 can include physical or virtual resources and applications (including hypervisors) used to execute the system 1500. The VIM 1502 may manage the life cycle of virtual resources with the NFVI 1504 (e.g., creation, maintenance, and tear down of VMs associated with one or more physical resources), track VM instances, track performance, fault and security of VM instances and associated physical resources, and expose VM instances and associated physical resources to other management systems.

The VNFM 1506 may manage the VNFs 1508. The VNFs 1508 may be used to execute EPC components/functions. The VNFM 1506 may manage the life cycle of the VNFs 1508 and track performance, fault and security of the virtual aspects of VNFs 1508. The EM 1510 may track the performance, fault and security of the functional aspects of VNFs 1508. The tracking data from the VNFM 1506 and the EM 1510 may comprise, for example, PM data used by the VIM 1502 or the NFVI 1504. Both the VNFM 1506 and the EM 1510 can scale up/down the quantity of VNFs of the system 1500.

The NFVO 1512 may coordinate, authorize, release and engage resources of the NFVI 1504 in order to provide the requested service (e.g., to execute an EPC function, component, or slice). The NM 1514 may provide a package of end-user functions with the responsibility for the management of a network, which may include network elements with VNFs, non-virtualized network functions, or both (management of the VNFs may occur via the EM 1510).

Figure 16:
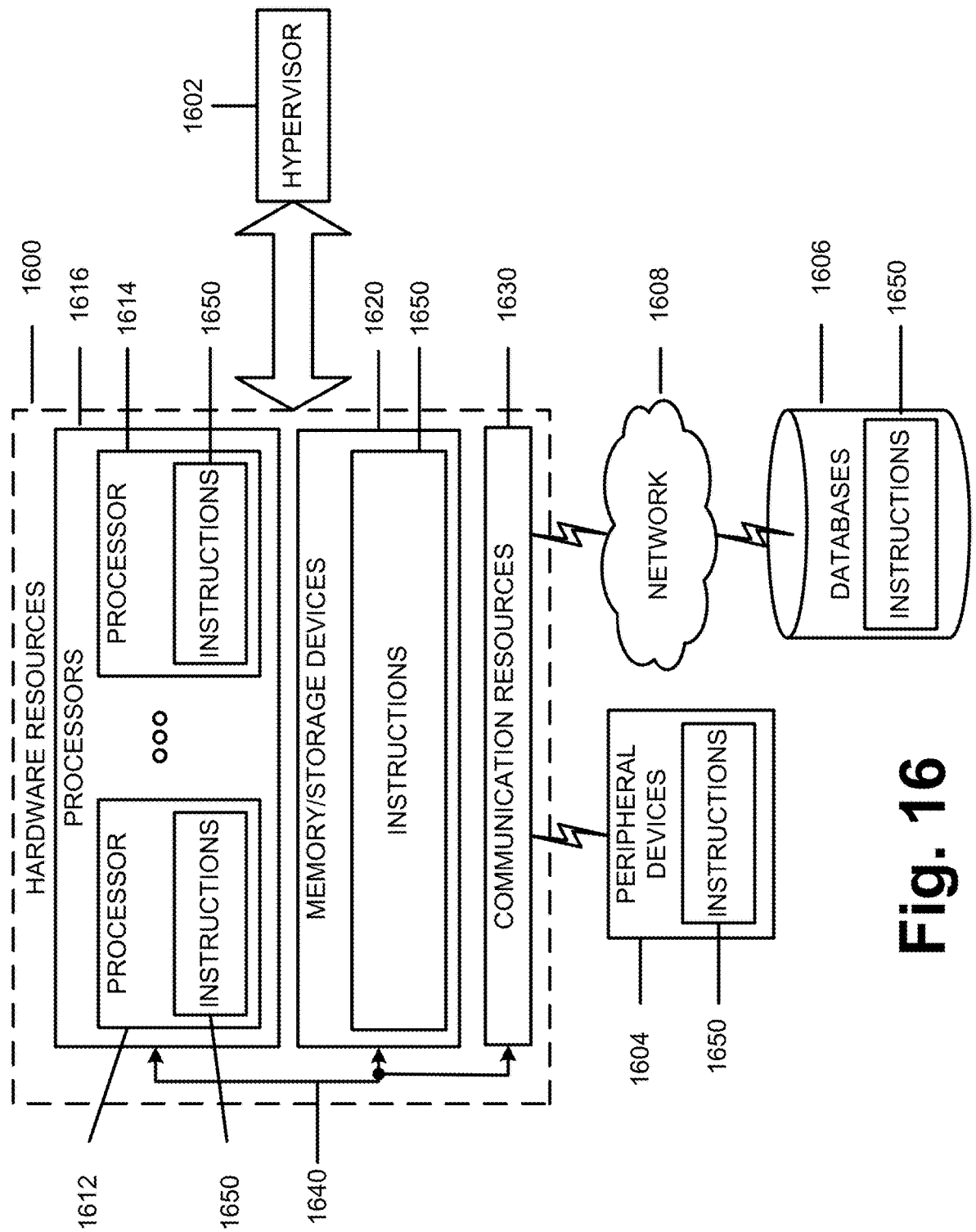
FIG. 16 illustrates a block diagram showing components, according to some example embodiments, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 may include, for example, a processor 1612 and a processor 1614. The processor(s) 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via USB), cellular communication components, NFC components, Bluetooth® (or Bluetooth® Low Energy) components, Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding Figures may be configured to operate in accordance with one or more of the examples set forth below. For another example, circuitry associated with a UE, base station, network element, etc. as described above in connection with one or more of the preceding Figures may be configured to operate in accordance with one or more of the examples set forth below in the example section.

The components of FIGS. 1-16 may be used in any of the embodiments described herein.

Figure 17:
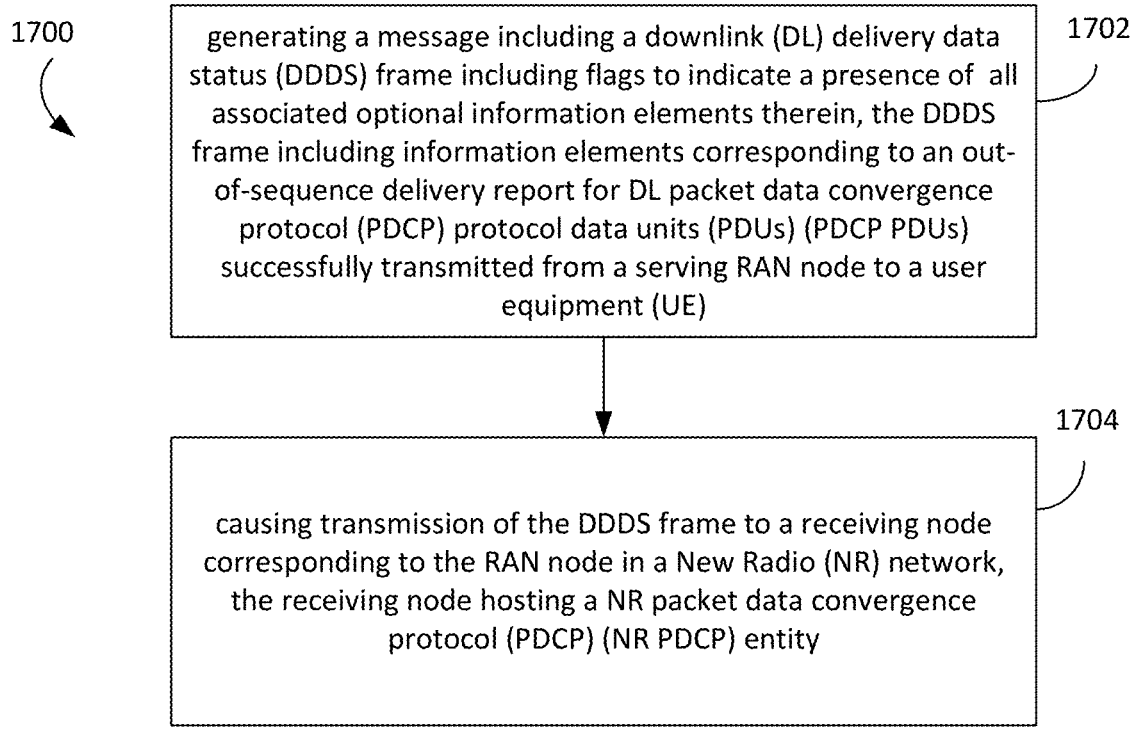
FIG. 17 illustrates a flow for a first method according to a first embodiment.
Figure 18:
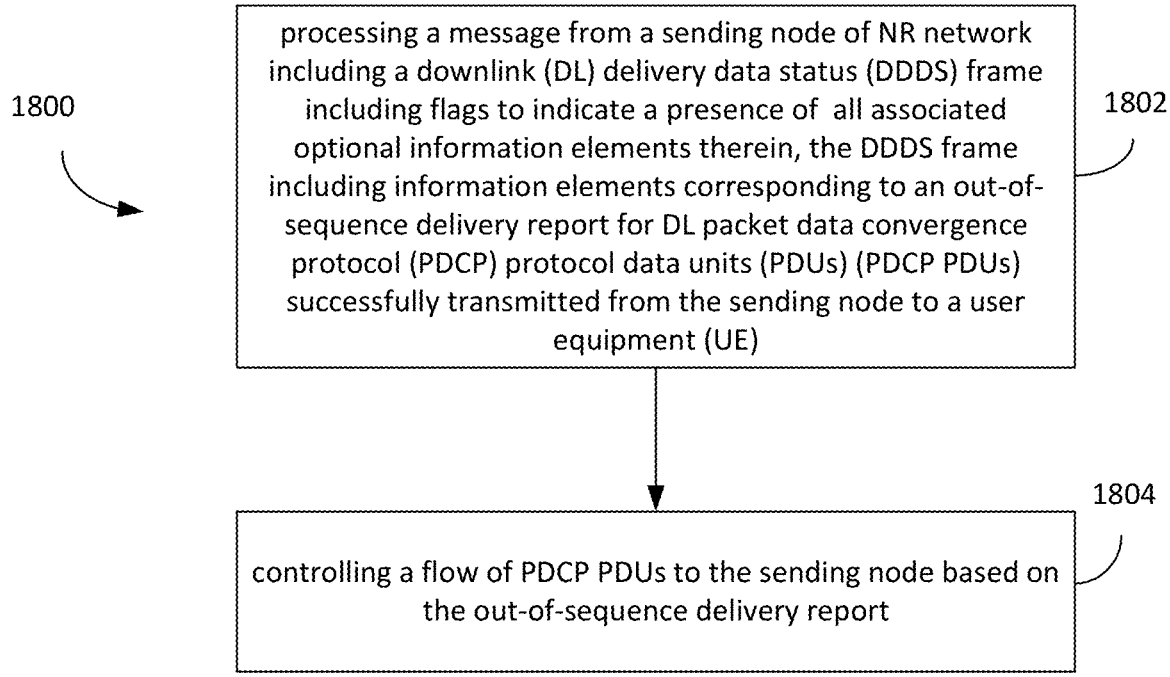
FIG. 18 illustrates a flow for a second method according to a second embodiment.

FIGS. 17 and 18 show respective flows for a first and second method according to a first and second embodiment.

FIG. 17 shows a flow 1700 for a method to be performed at a an apparatus of sending a radio access node (RAN node) in a New Radio (NR) network. At operation 1702, the method includes generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE). At operation 1704, the method includes causing transmission of the DDDS frame to a receiving node corresponding to the RAN node in a New Radio (NR) network, the receiving node hosting a NR packet data convergence protocol (PDCP) (NR PDCP) entity.

FIG. 18 shows a flow 1800 for a method to be performed at an apparatus of a receiving node of a New Radio (NR) network hosting a NR packet data convergence protocol (PDCP) (NR PDCP) entity in a NR network. At operation 1802, the method includes processing a message from a sending node of the NR network including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE). At operation 1804, the method includes controlling a flow of PDCP PDUs to the sending node based on the out-of-sequence delivery report.

In some embodiments, the electronic device(s), network(s), system(s), chip(s) or component(s), or portions or implementations thereof, of FIGS. 7-16, or some other figure herein, may be configured to perform one or more processes, techniques, or methods as described herein, or portions thereof. Examples of such processes are depicted in FIGS. 17 and 18. For example, the process may include generating or causing to generate a message that indicates a downlink (DL) data delivery status; and transmitting or causing to transmit the message to a receiving node. Another such process may include generating or causing to generate an enhanced DL USER DATA frame to trigger an out-of-sequence delivery status report; and transmitting or causing to transmit the message to a corresponding node.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes an apparatus of a radio access node (RAN node), the apparatus comprising: a Radio Frequency (RF) circuitry interface to send and receive messages to and from a RF circuitry; and one or more processors coupled to the RF circuitry interface, the one or more processors to generate a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and cause transmission of the DDDS frame to a receiving node corresponding to the RAN node in a New Radio (NR) network, the receiving node hosting a NR packet data convergence protocol (PDCP) (NR PDCP) entity.

Example 2 includes the subject matter of Example 1, and optionally, wherein the information elements corresponding to the out-of-sequence delivery report include information element to indicate a presence of additional information elements corresponding to the out-of-sequence delivery report.

Example 3 includes the subject matter of Example 2, and optionally, wherein the information element to indicate a presence has a length of one bit.

Example 4 includes the subject matter of Example 2, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 5 includes the subject matter of Example 4, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 6 includes the subject matter of Example 5, and optionally, wherein the information element indicating Number of out-of-sequence number ranges reported has a Value range of {1 . . . 255} and a field length of one octet.

Example 7 includes the subject matter of Example 4, and optionally, wherein the start information element and the end information element each have a Value range of {0 . . . $2^{18}-1$}.

Example 8 includes the subject matter of Example 1, and optionally, further including a radio front end module coupled to the one or more processors.

Example 9 includes the subject matter of Example 8, and optionally, further including one or more antennas coupled to the one or more processors, the antennas to transmit the DDDS frame.

Example 10 includes one or more non-transitory computer-readable media comprising instructions to cause an device of a radio access node (RAN node), upon execution of the instructions by one or more processors of the device, to perform operations including: generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and causing transmission of the DDDS frame to a receiving node corresponding to the RAN node in a New Radio (NR) network, the receiving node hosting a NR packet data convergence protocol (PDCP) (NR PDCP) entity.

Example 11 includes the subject matter of Example 10, and optionally, wherein the information elements corresponding to the out-of-sequence delivery report include information element to indicate a presence of additional information elements corresponding to the out-of-sequence delivery report.

Example 12 includes the subject matter of Example 11, and optionally, wherein the information element to indicate a presence has a length of one bit.

Example 13 includes the subject matter of Example 12, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 14 includes the subject matter of Example 13, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 15 includes the subject matter of Example 14, and optionally, wherein the information element indicating Number of out-of-sequence number ranges reported has a Value range of {1 . . . 255} and a field length of one octet.

Example 16 includes the subject matter of Example 13, and optionally, wherein the start information element and the end information element each have a Value range of {0 . . . $2^{18}-1$}.

Example 17 includes a method to be performed at an device of a radio access node (RAN node) in a New Radio (NR) network, the method comprising: generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and causing transmission of the DDDS frame to a receiving node corresponding to the RAN node in a New Radio (NR) network, the receiving node hosting a NR packet data convergence protocol (PDCP) (NR PDCP) entity.

Example 18 includes the subject matter of Example 17, and optionally, wherein the information elements corresponding to the out-of-sequence delivery report include information element to indicate a presence of additional information elements corresponding to the out-of-sequence delivery report.

Example 19 includes the subject matter of Example 18, and optionally, wherein the information element to indicate a presence has a length of one bit.

Example 20 includes the subject matter of Example 18, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 21 includes the subject matter of Example 20, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 22 includes the subject matter of Example 21, and optionally, wherein the information element indicating Number of out-of-sequence number ranges reported has a Value range of {1 . . . 255} and a field length of one octet.

Example 23 includes the subject matter of Example 20, and optionally, wherein the start information element and the end information element each have a Value range of {0 . . . $2^{18}-1$}.

Example 24 includes the subject matter of Example 17, and optionally, further including transmitting the DDDS frame to the receiving node.

Example 25 includes a device of a radio access node (RAN node) in a New Radio (NR) network, the device comprising: means for generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and means for causing transmission of the DDDS frame to a receiving node corresponding to the RAN node in a New Radio (NR) network, the receiving node hosting a NR packet data convergence protocol (PDCP) (NR PDCP) entity.

Example 26 includes the subject matter of Example 25, and optionally, wherein the information elements corresponding to the out-of-sequence delivery report include information element to indicate a presence of additional information elements corresponding to the out-of-sequence delivery report.

Example 27 includes the subject matter of Example 26, and optionally, wherein the information element to indicate a presence has a length of one bit.

Example 28 includes the subject matter of Example 26, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 29 includes the subject matter of Example 28, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 30 includes the subject matter of Example 29, and optionally, wherein the information element indicating Number of out-of-sequence number ranges reported has a Value range of $\{1 \ldots 255\}$ and a field length of one octet.

Example 31 includes the subject matter of Example 28, and optionally, wherein the start information element and the end information element each have a Value range of $\{0 \ldots 2^{18}-1\}$.

Example 32 includes the subject matter of Example 25, and optionally, further including means to transmit the DDDS frame.

Example 33 includes a device of a receiving node of a New Radio (NR) network, the receiving node hosting a NR packet data convergence protocol (PDCP) (NR PDCP) entity, the device comprising: memory circuitry; and one or more processors coupled to the memory circuitry, the one or more processors to: process a message from a sending node of the NR network, the message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and control a flow of PDCP PDUs to the sending node based on the out-of-sequence delivery report.

Example 34 includes the subject matter of Example 33, and optionally, wherein the information elements corresponding to the out-of-sequence delivery report include information element to indicate a presence of additional information elements corresponding to the out-of-sequence delivery report.

Example 35 includes the subject matter of Example 34, and optionally, wherein the information element to indicate a presence has a length of one bit.

Example 36 includes the subject matter of Example 34, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 37 includes the subject matter of Example 36, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 38 includes the subject matter of Example 37, and optionally, wherein the information element indicating Number of out-of-sequence number ranges reported has a Value range of $\{1 \ldots 255\}$ and a field length of one octet.

Example 39 includes the subject matter of Example 36, and optionally, wherein the start information element and the end information element each have a Value range of $\{0 \ldots 2^{18}-1\}$.

Example 40 includes the subject matter of Example 33, and optionally, further including a radio front end module coupled to the one or more processors.

Example 41 includes the subject matter of Example 40, and optionally, further including one or more antennas coupled to the one or more processors, the antennas to transmit the DDDS frame.

Example 42 includes one or more non-transitory computer-readable media comprising instructions to cause an device of a receiving node of a New Radio (NR) network hosting a NR packet data convergence protocol (PDCP) (NR PDCP) entity, upon execution of the instructions by one or more processors of the device, to perform operations including: processing a message from a sending node of the NR network including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and controlling a flow of PDCP PDUs to the sending node based on the out-of-sequence delivery report.

Example 43 includes the subject matter of Example 42, and optionally, wherein the information elements corresponding to the out-of-sequence delivery report include information element to indicate a presence of additional information elements corresponding to the out-of-sequence delivery report.

Example 44 includes the subject matter of Example 43, and optionally, wherein the information element to indicate a presence has a length of one bit.

Example 45 includes the subject matter of Example 43, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 46 includes the subject matter of Example 45, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 47 includes the subject matter of Example 46, and optionally, wherein the information element indicating Number of out-of-sequence number ranges reported has a Value range of {1 . . . 255} and a field length of one octet.

Example 48 includes the subject matter of Example 46, and optionally, wherein the start information element and the end information element each have a Value range of {0 . . . $2^{18}-1$}.

Example 49 includes a method to be performed at an device of a receiving node of a New Radio (NR) network hosting a NR packet data convergence protocol (PDCP) (NR PDCP) entity in a NR network, the method comprising: processing a message from a sending node of the NR network including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and controlling a flow of PDCP PDUs to the sending node based on the out-of-sequence delivery report.

Example 50 includes the subject matter of Example 49, and optionally, wherein the information elements corresponding to the out-of-sequence delivery report include information element to indicate a presence of additional information elements corresponding to the out-of-sequence delivery report.

Example 51 includes the subject matter of Example 50, and optionally, wherein the information element to indicate a presence has a length of one bit.

Example 52 includes the subject matter of Example 50, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 53 includes the subject matter of Example 52, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 54 includes the subject matter of Example 53, and optionally, wherein the information element indicating Number of out-of-sequence number ranges reported has a Value range of {1 . . . 255} and a field length of one octet.

Example 55 includes the subject matter of Example 52, and optionally, wherein the start information element and the end information element each have a Value range of {0 . . . $2^{18}-1$}.

Example 56 includes a device of a receiving node of a New Radio (NR) network hosting a NR packet data convergence protocol (PDCP) (NR PDCP) entity, the device comprising: means for processing a message from a sending node of the NR network including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully transmitted or delivered from the RAN node to a user equipment (UE); and means for controlling a flow of PDCP PDUs to the sending node based on the out-of-sequence delivery report.

Example 57 includes the subject matter of Example 56, and optionally, wherein the information elements corresponding to the out-of-sequence delivery report include information element to indicate a presence of additional information elements corresponding to the out-of-sequence delivery report.

Example 58 includes the subject matter of Example 57, and optionally, wherein the information element to indicate a presence has a length of one bit.

Example 59 includes the subject matter of Example 57, and optionally, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

Example 60 includes the subject matter of Example 59, and optionally, wherein the information element to indicate a presence has a length of one bit, and is set to 1 to indicate a presence of an information element indicating Number of out-of-sequence number ranges reported, and to be set to zero to indicate an absence of the start information element and of the end information element.

Example 61 includes the subject matter of Example 60, and optionally, wherein the information element indicating Number of out-of-sequence number ranges reported has a Value range of {1 . . . 255} and a field length of one octet.

Example 62 includes the subject matter of Example 59, and optionally, wherein the start information element and the end information element each have a Value range of {0 . . . $2^{18}-1$}.

Example 63 includes the subject matter of Example 56, and optionally, further including means to transmit the DDDS frame.

Example 64 may include an device comprising means to perform one or more elements of a method described in or related to any of the examples above, or any other method or process described herein.

Example 64 may include one or more non-transitory computer-readable media comprising instructions to cause an electronic device, upon execution of the instructions by one or more processors of the electronic device, to perform one or more elements of a method described in or related to any of the examples above, or any other method or process described herein.

Example 65 may include an apparatus comprising logic, modules, or circuitry to perform one or more elements of a method described in or related to any of the examples above, or any other method or process described herein.

Example 66 may include a method, technique, or process as described in or related to any of the examples above, or portions or parts thereof.

Example 67 may include an apparatus comprising: one or more processors and one or more computer-readable media comprising instructions that, when executed by the one or more processors, cause the one or more processors to perform the method, techniques, or process as described in or related to any of the examples above, or portions thereof.

Example 68 may include a signal as described in or related to any of the examples above, or portions or parts thereof.

Example 69 may include a datagram, packet, frame, segment, protocol data unit (PDU), or message as described in or related to any of the examples above, or portions or parts thereof, or otherwise described in the present disclosure.

Example 70 may include a signal encoded with data as described in or related to any of the examples above, or portions or parts thereof, or otherwise described in the present disclosure.

Example 71 may include a signal encoded with a datagram, packet, frame, segment, protocol data unit (PDU), or message as described in or related to any of the examples above, or portions or parts thereof, or otherwise described in the present disclosure.

Example 72 may include an electromagnetic signal carrying computer-readable instructions, wherein execution of the computer-readable instructions by one or more processors is to cause the one or more processors to perform the method, techniques, or process as described in or related to any of the examples above, or portions thereof.

Example 73 may include a computer program comprising instructions, wherein execution of the program by a processing element is to cause the processing element to carry out the method, techniques, or process as described in or related to any of the examples above, or portions thereof.

Example 74 may include a signal in a wireless network as shown and described herein.

Example 75 may include a method of communicating in a wireless network as shown and described herein.

Example 76 may include a system for providing wireless communication as shown and described herein.

Example 77 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus of a radio access node (RAN node), the apparatus comprising:
    a Radio Frequency (RF) circuitry interface to send and receive messages to and from a RF circuitry; and
    one or more processors coupled to the RF circuitry interface, the one or more processors to:
        generate a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully delivered from the RAN node to a user equipment (UE); and
        cause transmission of the DDDS frame to a receiving node corresponding to the RAN node in a New Radio (NR) network, the receiving node hosting a NR packet data convergence protocol (PDCP) (NR PDCP) entity.

2. The apparatus of claim 1, wherein the information elements corresponding to the out-of-sequence delivery report include information element to indicate a presence of additional information elements corresponding to the out-of-sequence delivery report.

3. The apparatus of claim 2, wherein the information element to indicate a presence has a length of one bit.

4. The apparatus of claim 2, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

5. The apparatus of claim 4, wherein the information element to indicate a presence has a length of one bit, and is set to 1 to indicate a presence of an information element indicating Number of out-of-sequence number ranges reported, and to be set to zero to indicate an absence of the start information element and of the end information element.

6. The apparatus of claim 5, wherein the information element indicating Number of out-of-sequence number ranges reported has a Value range of $\{1 \ldots 255\}$ and a field length of one octet.

7. The apparatus of claim 4, wherein the start information element and the end information element each have a Value range of $\{0 \ldots 2^{18}-1\}$.

8. The apparatus of claim 1, further including a radio front end module coupled to the one or more processors.

9. The apparatus of claim 8, further including one or more antennas coupled to the one or more processors, the antennas to transmit the DDDS frame.

10. A method to be performed at an apparatus of a radio access node (RAN node) in a New Radio (NR) network, the method comprising:
    generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully delivered from the RAN node to a user equipment (UE); and
    causing transmission of the DDDS frame to a receiving node corresponding to the RAN node in a New Radio (NR) network, the receiving node hosting a NR packet data convergence protocol (PDCP) (NR PDCP) entity.

11. The method of claim 10, wherein the information elements corresponding to the out-of-sequence delivery report include information element to indicate a presence of additional information elements corresponding to the out-of-sequence delivery report.

12. The method of claim 11, wherein the information element to indicate a presence has a length of one bit.

13. The method of claim 11, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

14. The method of claim 13, wherein the information element to indicate a presence has a length of one bit, and is set to 1 to indicate a presence of an information element indicating Number of out-of-sequence number ranges reported, and to be set to zero to indicate an absence of the start information element and of the end information element.

15. The method of claim 14, wherein the information element indicating Number of out-of-sequence number ranges reported has a Value range of {1 . . . 255} and a field length of one octet.

16. One or more non-transitory computer-readable media comprising instructions to cause an apparatus of a receiving node of a New Radio (NR) network hosting a NR packet data convergence protocol (PDCP) (NR PDCP) entity, upon execution of the instructions by one or more processors of the apparatus, to perform operations including:
processing a message from a sending node of the NR network including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully delivered from the RAN node to a user equipment (UE); and
controlling a flow of PDCP PDUs to the sending node based on the out-of-sequence delivery report.

17. The one or more non-transitory computer-readable media of claim 16, wherein the information elements corresponding to the out-of-sequence delivery report include information element to indicate a presence of additional information elements corresponding to the out-of-sequence delivery report.

18. The one or more non-transitory computer-readable media of claim 17, wherein the information element to indicate a presence has a length of one bit.

19. The one or more non-transitory computer-readable media of claim 17, wherein the additional information elements include a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

20. The one or more non-transitory computer-readable media of claim 19, wherein the information element to indicate a presence has a length of one bit, and is set to 1 to indicate a presence of an information element indicating Number of out-of-sequence number ranges reported, and to be set to zero to indicate an absence of the start information element and of the end information element.

21. The one or more non-transitory computer-readable media of claim 20, wherein the information element indicating Number of out-of-sequence number ranges reported has a Value range of {1 . . . 255} and a field length of one octet.

22. The one or more non-transitory computer-readable media of claim 20, wherein the start information element and the end information element each have a Value range of $\{0 \ldots 2^{18}-1\}$.

23. An apparatus of a radio access node (RAN node) in a New Radio (NR) network, the apparatus comprising:
means for generating a message including a downlink (DL) delivery data status (DDDS) frame including flags to indicate a presence of all associated optional information elements therein, the DDDS frame including information elements corresponding to an out-of-sequence delivery report for DL packet data convergence protocol (PDCP) protocol data units (PDUs) (PDCP PDUs) successfully delivered from the RAN node to a user equipment (UE); and
means for causing transmission of the DDDS frame to a receiving node corresponding to the RAN node in a New Radio (NR) network, the receiving node hosting a NR packet data convergence protocol (PDCP) (NR PDCP) entity.

24. The apparatus of claim 23, wherein the information elements corresponding to the out-of-sequence delivery report include an information element to indicate a presence of additional information elements corresponding to the out-of-sequence delivery report, the additional information elements including a start information element to indicate a Start of Out-of-sequence Number range corresponding to a start of a PDCP PDU sequence number range reported to be successfully delivered, and an end information element to indicate an End of Out-of-sequence Number range corresponding to an end of a PDCP PDU sequence number range reported to be successfully delivered.

25. The apparatus of claim 24, wherein the information element to indicate a presence has a length of one bit, and is set to 1 to indicate a presence of an information element indicating Number of out-of-sequence number ranges reported, and to be set to zero to indicate an absence of the start information element and of the end information element.

* * * * *